US011328476B2

(12) United States Patent
Stekovic et al.

(10) Patent No.: US 11,328,476 B2
(45) Date of Patent: May 10, 2022

(54) LAYOUT ESTIMATION USING PLANES

(71) Applicant: QUALCOMM Incorporated, San Diego, CA (US)

(72) Inventors: Sinisa Stekovic, Graz (AT); Friedrich Fraundorfer, Graz (AT); Vincent Lepetit, Talence (FR)

(73) Assignee: QUALCOMM Incorporated, San Diego, CA (US)

(*) Notice: Subject to any disclaimer, the term of this patent is extended or adjusted under 35 U.S.C. 154(b) by 58 days.

(21) Appl. No.: 16/836,269

(22) Filed: Mar. 31, 2020

(65) Prior Publication Data

US 2021/0150805 A1    May 20, 2021

Related U.S. Application Data

(60) Provisional application No. 62/935,492, filed on Nov. 14, 2019.

(51) Int. Cl.
| | |
|---|---|
| *G06T 17/00* | (2006.01) |
| *G06T 3/00* | (2006.01) |
| *G06T 3/60* | (2006.01) |
| *G06N 20/00* | (2019.01) |
| *G06T 7/11* | (2017.01) |
| *G06T 7/77* | (2017.01) |
| *G06T 19/00* | (2011.01) |

(52) U.S. Cl.
CPC ............ *G06T 17/00* (2013.01); *G06N 20/00* (2019.01); *G06T 3/0056* (2013.01); *G06T 3/60* (2013.01); *G06T 7/11* (2017.01); *G06T 7/77* (2017.01); *G06T 19/006* (2013.01)

(58) Field of Classification Search
CPC ........ G06T 7/11; G06T 3/0056; G06T 19/006
USPC ........................................... 345/419
See application file for complete search history.

(56) References Cited

U.S. PATENT DOCUMENTS

| | | | |
|---|---|---|---|
| 6,271,855 B1* | 8/2001 | Shum | G06T 17/00 345/427 |
| 2010/0315412 A1* | 12/2010 | Sinha | G06T 7/143 345/419 |
| 2019/0051054 A1* | 2/2019 | Jovanovic | G06F 3/04815 |
| 2020/0302686 A1* | 9/2020 | Totty | G06T 17/05 |

\* cited by examiner

*Primary Examiner* — Thomas J Lett
(74) *Attorney, Agent, or Firm* — Polsinelli

(57) ABSTRACT

Techniques are provided for determining one or more environmental layouts. For example, one or more planes can be detected in an input image of an environment. The one or more planes correspond to one or more objects in the input image. One or more three-dimensional parameters of the one or more planes can be determined. One or more polygons can be determined using the one or more planes and the one or more three-dimensional parameters of the one or more planes. A three-dimensional layout of the environment can be determined based on the one or more polygons.

30 Claims, 16 Drawing Sheets

FIG. 2

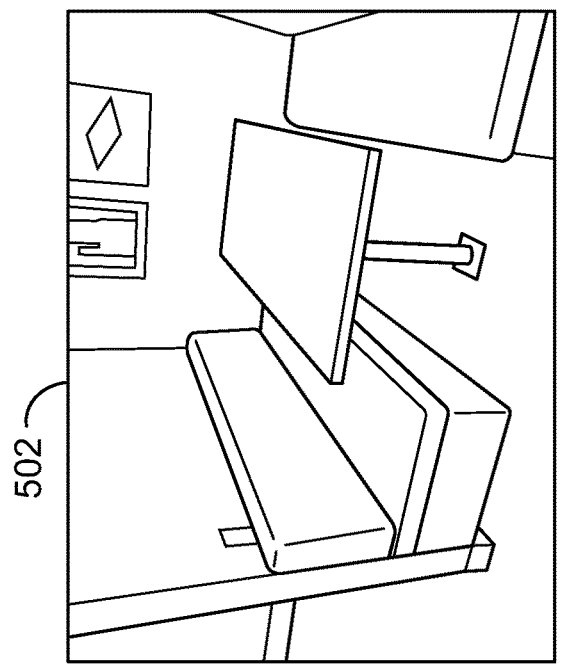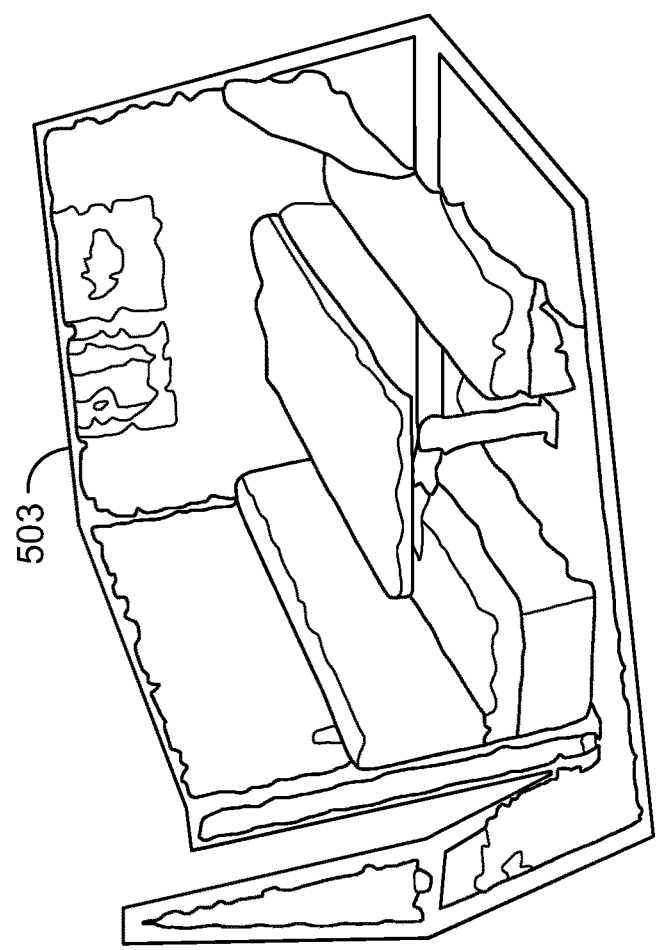
FIG. 5

Room Layout Depth

3D Reconstructed Layout

Room Layout

Room Layout Depth

3D Reconstructed Layout

Room Layout

Room Layout Depth

3D Reconstructed Layout

Room Layout

1400

```
┌─────────────────────────────────────────────────────────┐
│  DETECT ONE OR MORE PLANES IN AN INPUT IMAGE OF AN      │
│  ENVIRONMENT, THE ONE OR MORE PLANES CORRESPONDING      │
│     TO ONE OR MORE OBJECTS IN THE INPUT IMAGE           │
│                          1402                            │
└─────────────────────────────────────────────────────────┘
                              │
                              ▼
┌─────────────────────────────────────────────────────────┐
│  DETERMINE ONE OR MORE THREE-DIMENSIONAL PARAMETERS     │
│            OF THE ONE OR MORE PLANES                     │
│                          1404                            │
└─────────────────────────────────────────────────────────┘
                              │
                              ▼
┌─────────────────────────────────────────────────────────┐
│  DETERMINE ONE OR MORE POLYGONS USING THE ONE OR        │
│  MORE PLANES AND THE ONE OR MORE THREE-DIMENSIONAL       │
│        PARAMETERS OF THE ONE OR MORE PLANES              │
│                          1406                            │
└─────────────────────────────────────────────────────────┘
                              │
                              ▼
┌─────────────────────────────────────────────────────────┐
│     DETERMINE A THREE-DIMENSIONAL LAYOUT OF THE          │
│  ENVIRONMENT BASED ON THE ONE OR MORE POLYGONS          │
│                          1408                            │
└─────────────────────────────────────────────────────────┘
```

FIG. 14

LAYOUT ESTIMATION USING PLANES

CROSS-REFERENCE TO RELATED APPLICATIONS

This application claims the benefit of, and priority to, U.S. Provisional Patent Application No. 62/935,492, filed on Nov. 14, 2019, entitled "LAYOUT ESTIMATION USING PLANES", the contents of which are hereby expressly incorporated by reference in its entirety.

FIELD

The present disclosures generally relate to estimating layouts of environments in images, and more specifically to performing layout estimation using planes detected in images.

BACKGROUND

Three-dimensional room layout (e.g., walls, floor, ceiling, etc.) estimation from images (e.g., red-green-blue (RGB) images, RGB-Depth (RGBD) images, or other images) is useful for many vision guided tasks, such as indoor navigation, augmented reality (AR), robotics, automotive, aviation, three-dimensional scene understanding, object grasping, object tracking, among other tasks. For example, knowing the three-dimensional (3D) layout of a room provides a stable landmark for localization. In one illustrative example, items of furniture can move, but the layout does not change.

SUMMARY

In some embodiments, techniques and systems are described for estimating a layout (e.g., a three-dimensional (3D) layout) of a scene or environment depicted in an image. Layout estimation can be difficult in some scenarios. For instance, occlusions by objects in a room or other space (e.g., occlusions caused by furniture in a room) can cause problems when performing layout estimation. In one example, important image features of an environment, such as corners or edges, might be unobservable or only partially observable due to the occlusions. In other examples, occlusions can cause illumination effects (e.g., shadows, reflections, among others), can cause lack of textures in wall and ceiling regions, can lead to limited annotated data (e.g., for machine learning approaches), among others.

The techniques and systems described herein provide improved layout estimation, including 3D layout estimation, from one or more images. For example, planes can be detected and/or segmented from an input image. In some cases, planes known not to belong to a certain layout component or objects (e.g., a floor, a wall, or a ceiling in a room) can be discarded. Parameters can be obtained for the planes (e.g., 3D equations for planes corresponding to a floor, ceiling, wall, and/or other objects in an environment). Corners and edges (or boundaries) can be determined by computing intersections of the planes. The best fit of polygons for each representative plane (e.g., wall, ceiling, floor) can be determined based on the intersections. In some cases, layout components hidden by other layout components can be detected based on a discrepancy of layout estimate. In some cases, 3D layout can be iteratively refined based on one or more hidden layout components.

According to at least one example, a method of determining one or more environmental layouts is provided. The method includes detecting one or more planes in an input image of an environment. The one or more planes correspond to one or more objects in the input image. The method further includes determining one or more three-dimensional parameters of the one or more planes. The method further includes determining one or more polygons using the one or more planes and the one or more three-dimensional parameters of the one or more planes. The method further includes determining a three-dimensional layout of the environment based on the one or more polygons.

In another example, an apparatus for determining one or more environmental layouts is provided. The apparatus includes a memory configured to store one or more images and a processor implemented in circuitry and coupled to the memory. The processor is configured to and can detect one or more planes in an input image of an environment. The one or more planes correspond to one or more objects in the input image. The processor is configured to and can determine one or more three-dimensional parameters of the one or more planes. The processor is configured to and can determine one or more polygons using the one or more planes and the one or more three-dimensional parameters of the one or more planes. The processor is configured to and can determine a three-dimensional layout of the environment based on the one or more polygons.

In another example, a non-transitory computer readable medium having stored thereon instructions that, when executed by one or more processors, cause the one or more processor to: detect one or more planes in an input image of an environment, the one or more planes corresponding to one or more objects in the input image; determine one or more three-dimensional parameters of the one or more planes; determine one or more polygons using the one or more planes and the one or more three-dimensional parameters of the one or more planes; and determine a three-dimensional layout of the environment based on the one or more polygons.

In another example, an apparatus for determining one or more environmental layouts. The apparatus includes means for detecting one or more planes in an input image of an environment. The one or more planes correspond to one or more objects in the input image. The apparatus further includes means for determining one or more three-dimensional parameters of the one or more planes. The apparatus further includes means for determining one or more polygons using the one or more planes and the one or more three-dimensional parameters of the one or more planes. The apparatus further includes means for determining a three-dimensional layout of the environment based on the one or more polygons.

In some examples, the one or more planes include one or more two-dimensional planes.

In some examples, the one or more polygons include one or more three-dimensional polygons.

In some examples, the methods, apparatuses, and computer readable medium described above further comprise detecting the one or more planes using a machine learning model.

In some examples, the methods, apparatuses, and computer readable medium described above further comprise detecting the one or more planes using a machine learning model and semantic segmentation.

In some examples, the methods, apparatuses, and computer readable medium described above further comprise: determining one or more classes of the one or more planes; and selecting the one or more planes for use in generating the one or more three-dimensional polygons based on the one or more classes determined for one or more planes.

In some examples, the one or more classes for the one or more planes are detected using a machine learning model.

In some examples, the methods, apparatuses, and computer readable medium described above further comprise: detecting a plurality of planes in the input image, the plurality of planes belonging to a plurality of classes; determining, from the plurality of planes, the one or more planes belong to a subset of one or more classes from the plurality of classes; selecting the one or more planes for use in generating the one or more three-dimensional polygons based on the one or more planes belonging to the subset of one or more classes; and discarding at least plane of the plurality of planes that belongs to at least one class other than the subset of one or more classes.

In some examples, the plurality of classes are detected using a machine learning model.

In some examples, the one or more three-dimensional parameters include a normal vector and a plane offset for each plane of the one or more planes. In some examples, normal vector for a plane is represented by a vector that is orthogonal to the plane. In some examples, a plane offset for a plane indicates a distance of the plane from a camera.

In some examples, the methods, apparatuses, and computer readable medium described above further comprise: obtaining depth information associated with the one or more planes; and determining the one or more three-dimensional parameters of the one or more planes using the depth information.

In some examples, the depth information is obtained from one or more depth sensors. In some examples, the depth information is determined using a machine learning model.

In some examples, the methods, apparatuses, and computer readable medium described above further comprise: determining, using the three-dimensional parameters of the one or more planes, intersections between planes of the one or more planes; determining a candidate set of one or more polygons based on the intersections between the planes; determining a final set of one or more polygons from the candidate set of one or more polygons; and determining the three-dimensional layout of the environment using the final set of one or more polygons.

In some examples, determining the final set of one or more polygons from the candidate set of one or more polygons is based on a comparison of each polygon from the candidate set of one or more polygons to at least one of depth information, the detected one or more planes, and at least one other polygon from the candidate set of one or more polygons.

In some examples, the methods, apparatuses, and computer readable medium described above further comprise: determining, based on the one or more three-dimensional parameters, a polygon from the candidate set of one or more polygons is a greater distance from a camera than at least one object in the environment; and discarding the polygon from the candidate set of one or more polygons based on the determination that the polygon is further from the camera than the at least one object in the environment.

In some examples, the methods, apparatuses, and computer readable medium described above further comprise: comparing a polygon from the candidate set of one or more polygons to at least one plane from the detected one or more planes; and discarding the polygon from the candidate set of one or more polygons when the polygon differs from the at least one plane by a threshold amount.

In some examples, the methods, apparatuses, and computer readable medium described above further comprise discarding a polygon from the candidate set of one or more polygons when the polygon intersects with at least one other polygon from the candidate set of one or more polygons.

In some examples, the methods, apparatuses, and computer readable medium described above further comprise generating an output image based on the three-dimensional layout of the environment.

In some examples, the methods, apparatuses, and computer readable medium described above further comprise generating a three-dimensional model representing the three-dimensional layout of the environment.

In some examples, the methods, apparatuses, and computer readable medium described above further comprise: receiving a user input to manipulate the three-dimensional model; and adjusting at least one of a pose, a location, and a property of the three-dimensional model in an output image based on the user input.

In some examples, at least one of the pose, the location, and/or the property of the three-dimensional model is adjusted based on semantic information defined for the three-dimensional model.

In some examples, the apparatus is a mobile device (e.g., a mobile telephone or so-called "smart phone," or other mobile device), a wearable device, an extended reality device (e.g., a virtual reality (VR) device, an augmented reality (AR) device, or a mixed reality (MR) device, such as a head-mounted display (HMD), AR glasses, or other extended reality device), a personal computer, a laptop computer, or other computing device. In some aspects, the apparatus includes a camera or multiple cameras for capturing one or more images. In some aspects, the apparatus includes a display for displaying one or more images, notifications, and/or other displayable data.

This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings, and each claim.

The foregoing, together with other features and embodiments, will become more apparent upon referring to the following specification, claims, and accompanying drawings.

BRIEF DESCRIPTION OF THE DRAWINGS

Illustrative embodiments of the present application are described in detail below with reference to the following figures:

FIG. 2 is a diagram illustrating an example of a layout estimation approach, in accordance with some examples;

FIG. 5 is diagram illustrating an example of an input image and a 3D room layout estimated from the input image using the layout estimation system and techniques described herein, in accordance with some examples;

FIG. 14 is a flowchart illustrating an example of a process of determining one or more environmental layouts, in accordance with some examples;

DETAILED DESCRIPTION

Certain aspects and embodiments of this disclosure are provided below. Some of these aspects and embodiments may be applied independently and some of them may be applied in combination as would be apparent to those of skill in the art. In the following description, for the purposes of explanation, specific details are set forth in order to provide a thorough understanding of embodiments of the application. However, it will be apparent that various embodiments may be practiced without these specific details. The figures and description are not intended to be restrictive.

The ensuing description provides exemplary embodiments only, and is not intended to limit the scope, applicability, or configuration of the disclosure. Rather, the ensuing description of the exemplary embodiments will provide those skilled in the art with an enabling description for implementing an exemplary embodiment. It should be understood that various changes may be made in the function and arrangement of elements without departing from the spirit and scope of the application as set forth in the appended claims.

Figure 1:
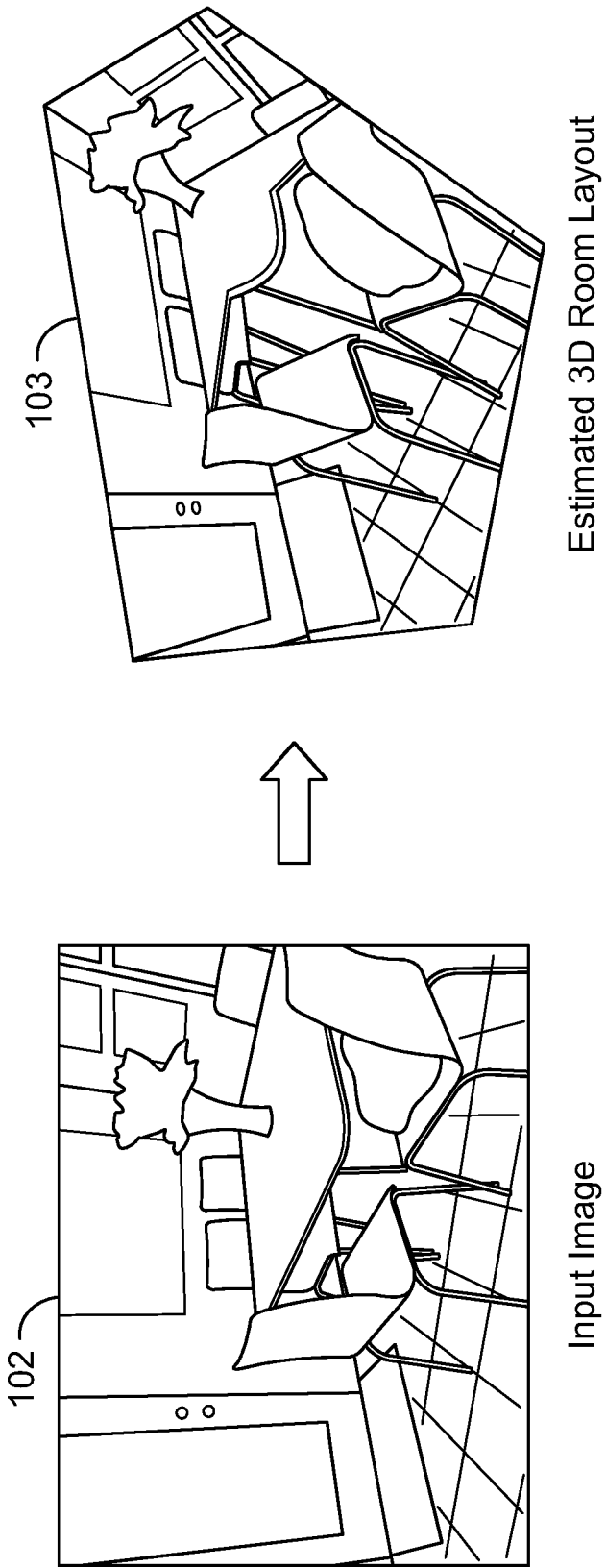
FIG. 1 is diagram illustrating an example of an input image and a 3D room layout estimated from the input image, in accordance with some examples.

As described in more detail herein, methods, systems, apparatuses, and computer-readable media are described for performing layout estimation (e.g., three-dimensional (3D) layout estimation) from one or more images. For example, as shown in FIG. 1, given a single input image 102 of a room, the techniques described herein can generate an estimated 3D layout of the room, as depicted by the output image 103. The image 102 can include a red-green-blue (RGB) image with red, green, and blue color components per pixel, an RGB-depth (RGBD) image with red, green, and blue color components and depth information per pixel, or other suitable image.

The techniques described herein can be used to determine the 3D layout of a room or other environment with a defined structure (e.g., a structure defined by one or more floors, ceilings, walls, and/or other objects). For instance, as described in more detail below, the techniques can detect and/or segment planes of an environment depicted in an input image. In some cases, planes that do not belong to any of certain defined layout components or objects are discarded. In one illustrative example, planes corresponding to the floor, ceiling, walls, and/or other objects in an environment are kept, while planes corresponding to other objects or components are discarded. 3D parameters for the remaining planes are calculated, and plane intersections are determined based on the parameters. The plane intersections can represent vertices of candidate polygons for the room layout. For instance, corners and edges (or boundaries) can be identified based on the intersections of the planes. The techniques can determine polygons based on the corners and edges. For instance, an exhaustive search (e.g., an analysis-by-synthesis approach) can be performed to find an optimal set of layout polygons for the image. The 3D layout of the environment can be determined based on the polygons.

In some examples, the techniques described herein can reconstruct the 3D layout of a room (including walls, floors, and ceilings) or other environment from a single perspective view. The 3D layout can be generated using a color image only (e.g., an RGB image), or can be generated using an RGBD image that includes depth information (e.g., a depth map or depth image). In some cases, considering a depth map can provide more accurate reconstruction results.

In some examples, the techniques can use a combination of machine learning (ML, a type of artificial intelligence) and 3D geometrical methods. For example, very limited annotated data may be available for general layouts. Such a lack of training data makes it difficult to train a machine learning model to perform layout estimation. Adding 3D geometric constraints can compensate for this lack of training data. Moreover, it is unclear how the problem can be formalized as a machine learning problem while predicting a physically possible 3D model. However, machine learning can be useful to provide 3D priors when considering single images.

Given a single image of an environment, the techniques described herein can detect the planes (e.g., 2D or 3D planes) corresponding to visible objects in the environment (e.g., walls, floors, and ceilings of a room). The planes can be detected more reliably than the rest of the layout, such as corners or edges. An analysis-by-synthesis approach can be performed to build a valid 3D polygonal model for the environmental layout (e.g., a room layout) from the planes and their intersections. FIG. 5 is a diagram illustrating an example of an input image 502 and an image depicting an estimated layout 503 generated from the input image 502.

Estimating the 3D layout of an environment (e.g., from a single perspective view) is an unsolved problem. 3D layout estimation from images (e.g., RGB images, RGBD images, or other images) can be useful for many tasks, as the components or objects of the layout (e.g., walls, floors, ceilings) provide stable landmarks in comparison to objects that can move or be moved. Examples of tasks for which 3D layout estimation can be applicable include indoor navigation and/or localization, augmented reality (AR), robotics, automotive, aviation, three-dimensional scene understanding, object grasping, object tracking, among other tasks. For example, knowing the 3D layout of a room provides a stable landmark for localization in comparison to items of furniture that can move, while the layout does not change.

Given an input image of an environment (e.g., a room), a goal of 3D layout estimation is to estimate a parametrized model representing all of the layout components of the environment in 3D. For multi-view scenarios, the candidate representations for the parametrized models are typically obtained from dense unstructured point clouds. For single perspective view scenarios, the parametrized models are typically 2D layout representations. As described in more detail below, the parametrized models resulting from the layout estimation techniques described herein are a combination of 3D planes and 2D polygons. For example, 2D polygons partition the image depicting the perspective view determining the 2D layout. As each 2D polygon is associated with a 3D plane, the joint model can enable the reconstruction of the 3D layout.

Estimating the 3D room layout from a single image can be challenging. For example, occlusions by objects in a room or other space (e.g., occlusions caused by furniture in a room) can cause problems when performing layout estimation. In one illustrative example, the view (from the camera's perspective) to the walls, the floors, and the ceilings can be obstructed based on furniture or other objects in typical room scenes. Important image features like corners or edges might be unobservable or only partially observable due to the occluding objects. In addition, the use of single perspective views (a single image of an environment) may rule out traditional methodology for point cloud processing (e.g., from using multi-view stereo reconstructions). In some cases, occlusions can cause illumination effects to occur (e.g., shadows, reflections, among others), can cause a lack of textures in wall and ceiling regions, can lead to limited annotated data (e.g., for machine learning approaches), among other problems.

Figure 2:
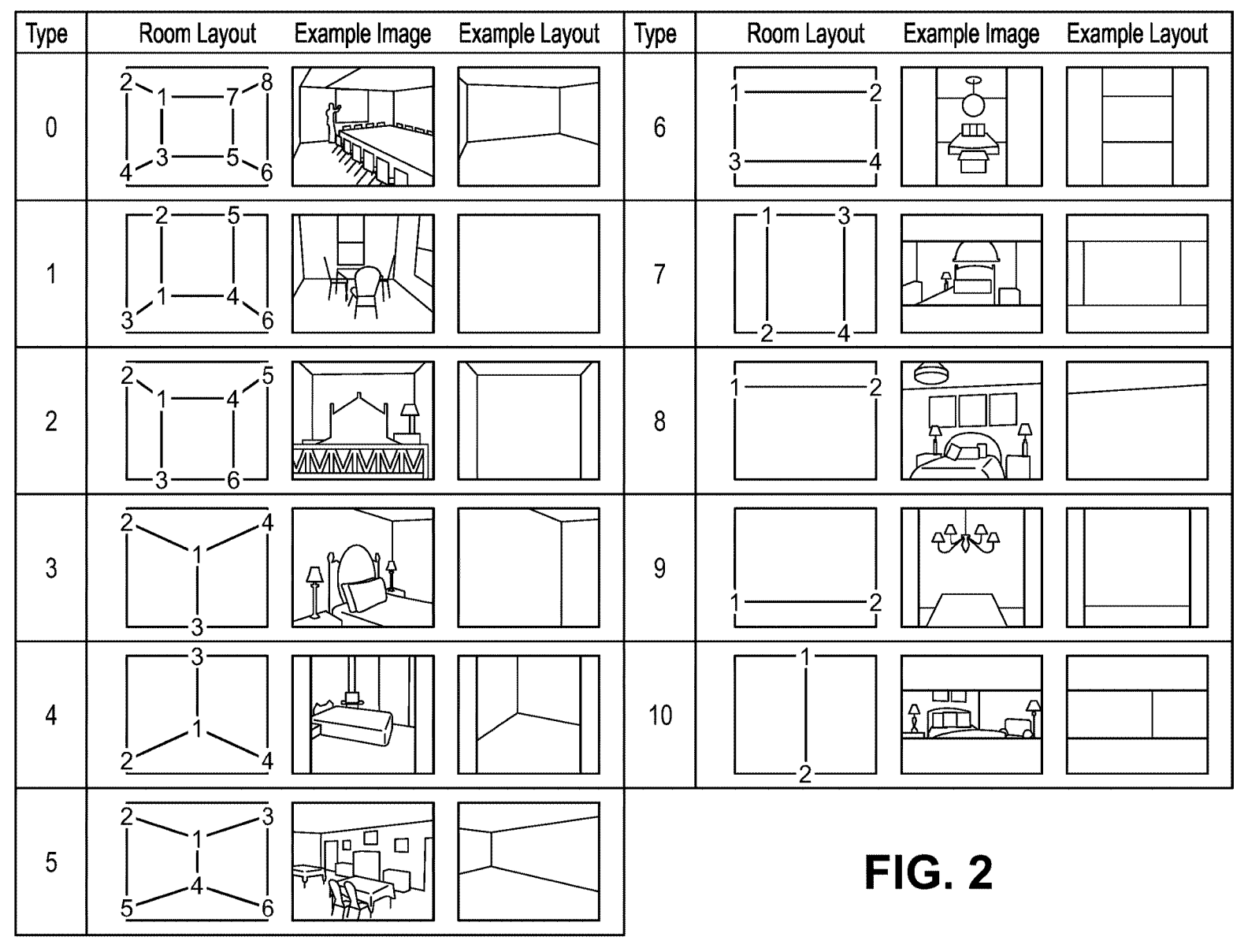

Existing solutions can have various limitations. For example, one approach (referred to as RoomNet) uses a convolutional neural network (CNN) to estimate the room key points, and uses predefined room types to estimate the layout edges. An illustration of the RoomNet approach is shown in FIG. 2. A limitation of the RoomNet approach is that a strong assumption is made that rooms are "Box-like", which can be an incorrect assumption in many cases. Another limitation of RoomNet is that the layout is estimated only in two-dimensions (2D), and a direct 3D representation of the layout not possible. Further, assumptions about the orientation of the layout components, as well as camera-to-floor and camera-to-ceiling distance, are necessary.

Figure 3:
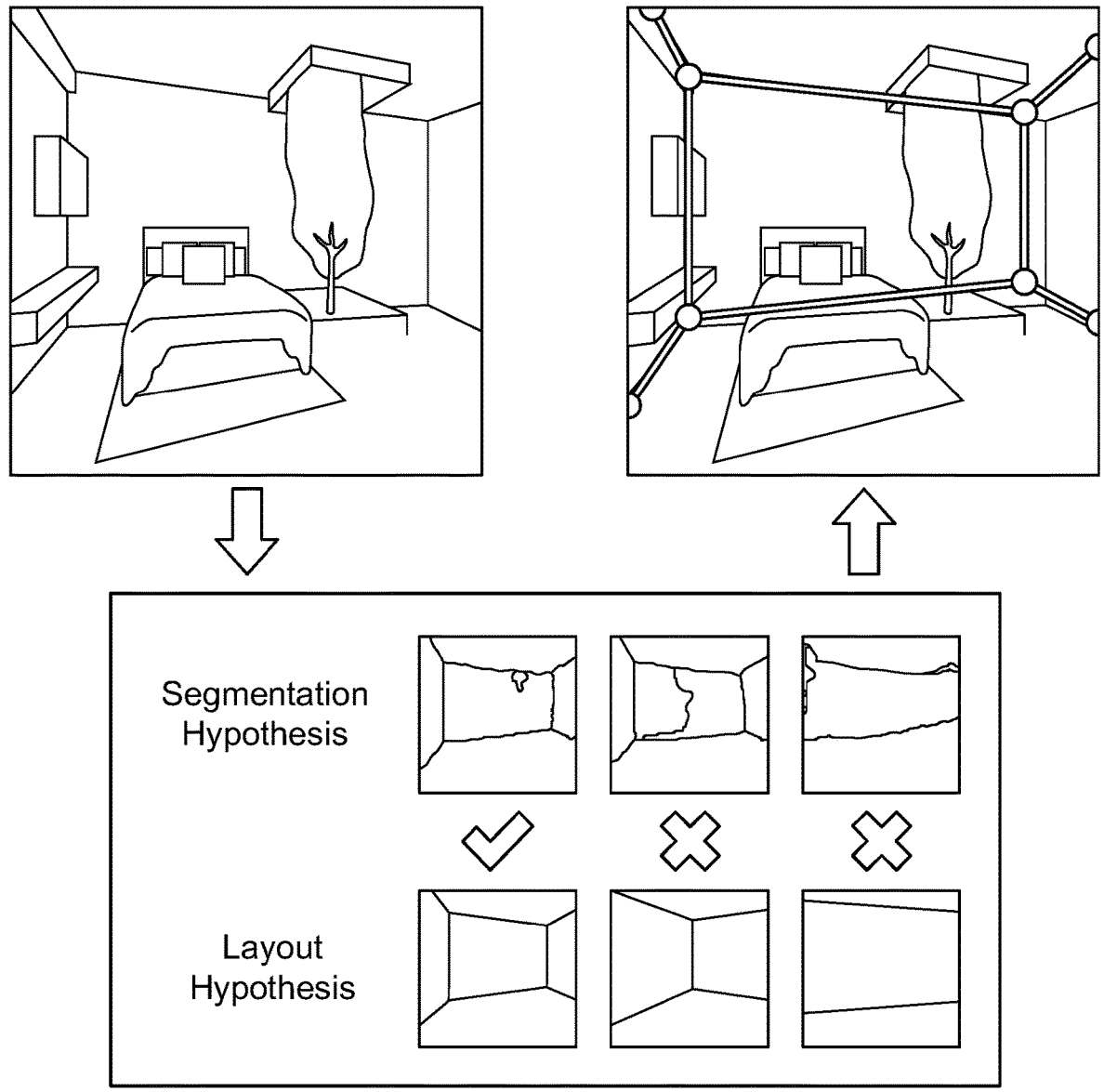
FIG. 3 is a diagram illustrating another example of a layout estimation approach, in accordance with some examples.

Another approach (referred to as the Hirzer approach) generates hypotheses that assume three different wall configurations in an image, predicts the corresponding layouts, and selects the layout with the best fit. FIG. 3 is an illustration of the Hirzer approach. The Hirzer approach is more accurate and more robust as compared to the Hirzer approach. Limitations associated with the Hirzer approach are similar to the limitations described above for the RoomNet approach.

Figure 4:
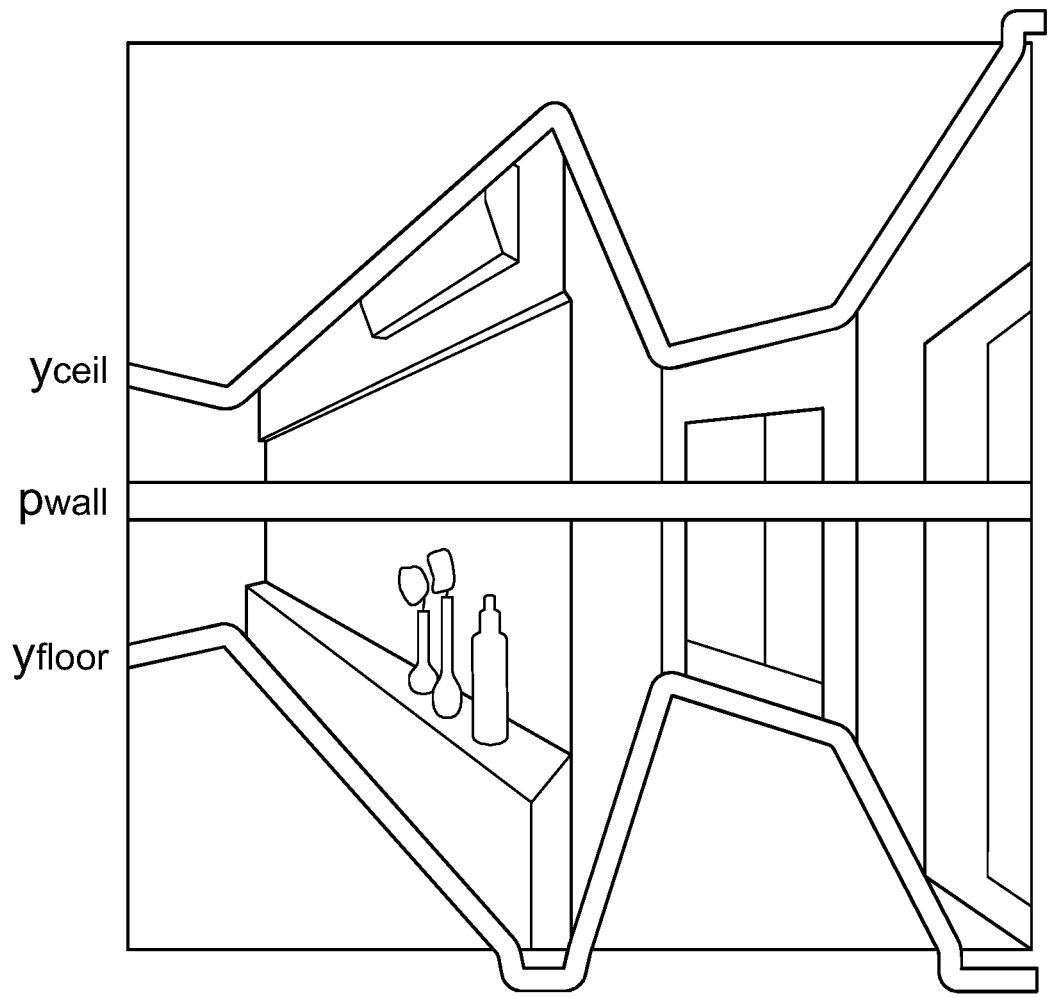
FIG. 4 is a diagram illustrating another example of a layout estimation approach, in accordance with some examples.

Another approach (referred to as the Flat2Layout approach) estimates the wall-floor, the wall-ceiling, and the wall-wall boundaries directly. An illustration of the Flat2Layout approach is shown in FIG. 4. A challenge with the Flat2Layout approach is that the approach assumes there is only one boundary per image column for the ceiling and the floor, which may not be true for complex environments (e.g., complex rooms). Another challenge with the Flat2Layout approach is that, due to a small amount of training data, the performance for general room layout estimation is low. Further, a direct 3D representation of the layout is not possible using the Flat2Layout approach.

While machine learning can be applied to perform layout estimation, machine learning on its own may not be enough to provide a quality layout estimation result. Machine learning can be useful for extracting 3D layout priors for non-occluded parts of the perspective view, but may not explain the behavior of these priors in occluded areas of the view. As detailed below, the techniques described herein can use geometrical reasoning in order to perceive the behavior of layout priors in occluded parts of the image.

Figure 6A:
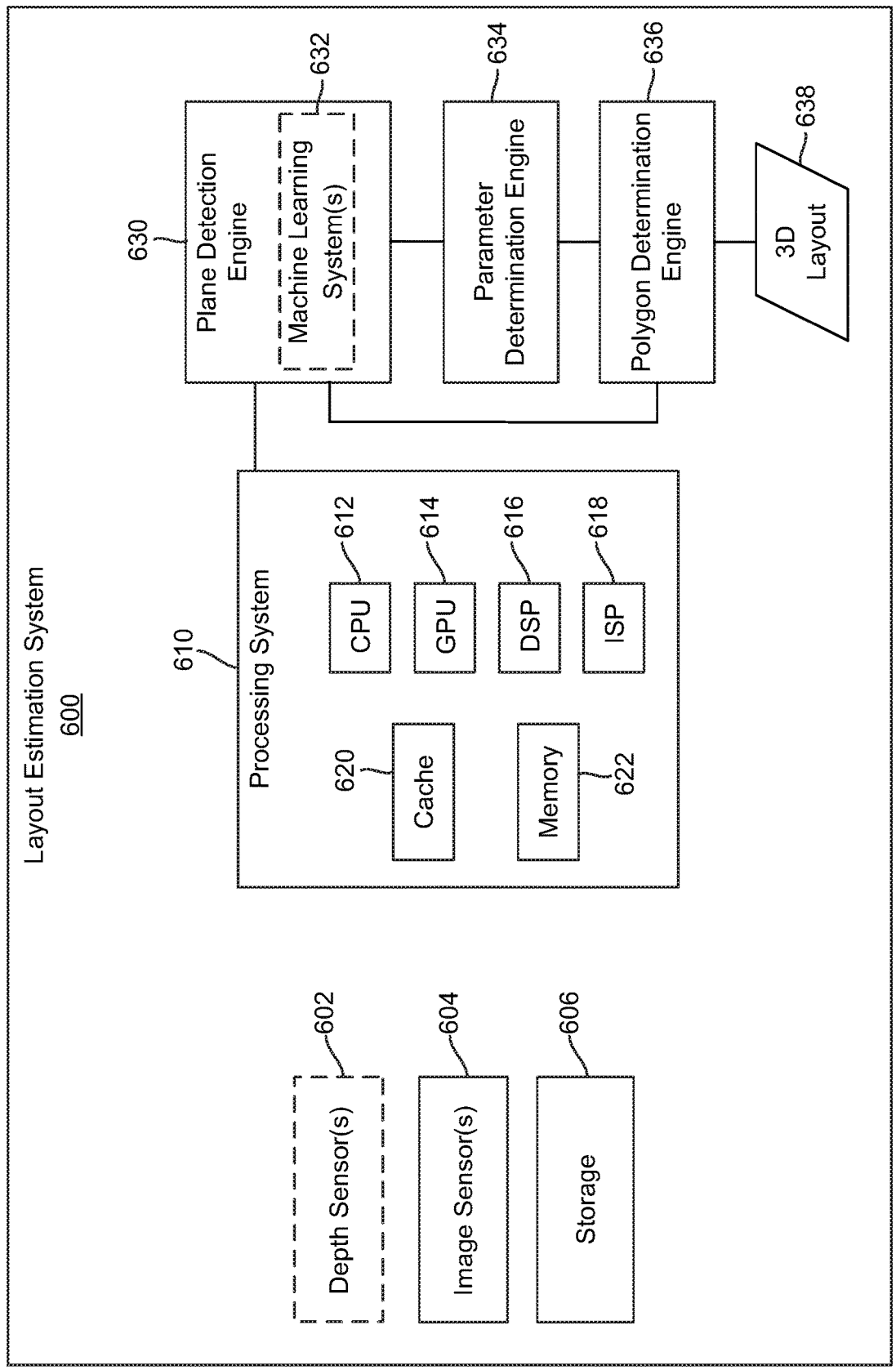
FIG. 6A is a diagram illustrating an example of a layout estimation system, in accordance with some examples.

As noted above, the systems and techniques described herein provide an improved approach to estimating the 3D layout of an environment. FIG. 6A is a diagram illustrating an example layout estimation system 600. The layout estimation system 100 includes one or more an image sensors 604, a storage 606, and optional one or more depth sensors 602 (as indicated by the dotted outline shown in FIG. 6A), a processing system 610, a plane detection engine 630, a parameter determination engine 634, and a polygon determination engine 636. In some examples, the plane detection engine 630 include a machine learning system 632, which can include one or more neural networks and/or other machine learning systems.

The processing system 610 can include components including, for example and without limitation, a central processing unit (CPU) 612, a graphics processing unit (GPU) 614, a digital signal processor (DSP) 616, and/or an image signal processor (ISP) 618, which the processing system 610 can use to perform one or more of the operations described herein. For example, the CPU 612, the GPU 614, the DSP 616, and/or the ISP 618 can include electronic circuits or other electronic hardware, such as one or more programmable electronic circuits. The CPU 612, the GPU 614, the DSP 616, and/or the ISP 618 can implement or execute computer software, firmware, or any combination thereof, to perform the various operations described herein. The software and/or firmware can include one or more instructions stored on a computer-readable storage medium and executable by one or more processors of the processing system 610. In some cases, one or more of the CPU 612, the GPU 614, the DSP 616, and/or the ISP 618 can implement the plane detection engine 630, the parameter determination engine 634, and/or the polygon determination engine 636. It should be noted that, in some examples, the processing system 610 implement one or more computing engines that are not shown in FIG. 6. The plane detection engine 630, the parameter determination engine 634, and the polygon determination engine 636 are provided herein for illustration and explanation purposes, and other possible computing engines are not shown for the sake of simplicity.

The layout estimation system 600 can be part of, or implemented by, a computing device or multiple computing devices. In some examples, the layout estimation system 600 can be part of an electronic device (or devices) such as a mobile device (e.g., a smartphone, a cellular telephone, or other mobile device), a camera system or device (e.g., a digital camera, a camera phone, a video phone, an IP camera, a video camera, a security camera, or other camera system or device), a laptop or notebook computer, a tablet computer, a set-top box, a television, a display device, a digital media player, a gaming console, a video streaming device, an extended reality device (e.g., a head-mounted display (HMD) for rendering virtual reality (VR), augmented reality (AR), and/or mixed reality (MR), AR glasses, or other extended reality device), a heads-up display (HUD), a drone, a computer system in a vehicle (e.g., an autonomous vehicle or a human-driven vehicle), an Internet-of-Things (IoT) device, a smart wearable device, or any other suitable electronic device(s).

In some implementations, the one or more depth sensors 602, the image sensor 604, the storage 606, the processing system 610, the plane detection engine 630, the parameter determination engine 634, and the polygon determination engine 636 can be part of the same computing device. For example, in some cases, the one or more depth sensors 602, the image sensor 604, the storage 606, the processing system 610, the plane detection engine 630, the parameter determination engine 634, and the polygon determination engine 636 can be integrated into a camera, smartphone, laptop, tablet computer, smart wearable device, HMD, AR glasses, IoT device, gaming system, and/or any other computing device. However, in some implementations, one or more of the depth sensor 602, the image sensor 604, the storage 606, the processing system 610, the plane detection engine 630, the parameter determination engine 634, and the polygon determination engine 636 can be part of, or implemented by, two or more separate computing devices.

The layout estimation system 600 provides an improved approach to estimating the 3D layout of an environment. For example, instead of detecting corners (like in RoomNet) or boundaries, the plane detection engine 630 can detect planes in an environment. 3D parameters of planes for certain layout components or objects in an environment (e.g., planes detected for the floor, the ceiling, and walls of a room) can be obtained or determined by the parameter determination engine 634. For example, in some cases, the parameter determination engine 634 can use depth information to determine 3D parameters of the planes for the layout components or objects in the environment. In some examples, the 3D parameters of a plane can include the normal vector (also referred to as the surface normal) of the plane and a plane offset indicating a distance of the plane from the camera center that captured the image. The corners and the boundaries can be recovered by computing the intersections of the planes. Annotations for 3D plane detection are plentiful (as compared to room layout annotations), providing the ability to train a machine learning model (e.g., a neural network) to perform high quality and accurate plane detection.

The layout estimation engine 600 can use 3D planes as primary geometric entities. Differing from previous layout estimation approaches, the layout estimation engine 600 can infer the 3D planes of the layout from a monocular image with many objects occluding the layout structure, such as furniture in a room. An algorithm is introduced herein, which can be implemented by the polygon determination engine 636 to create the 2D polygons that constitute the 2D layout of the environment. By joining the information from 2D polygons and 3D planes, a final 3D polygon is obtained or determined by the polygon determination engine 636. Considering planes rather than edges and/or corners keeps the approach described herein simple in terms of perception and model creation.

Machine learning can be used (e.g., by the machine learning system 632 of the plane detection engine 630) to reason about the image contents by identifying planar regions that belong to one of a defined set of semantic classes of the layout (e.g., a "wall" class corresponding to a wall, "floor" class corresponding to a floor, and a "ceiling" corresponding to a ceiling). As noted above, the amount of annotated data for general room layout estimation, in particular for 3D layout estimation, is very limited. However, there are numerous datasets available for training semantic segmentation machine learning models (e.g., neural networks) for indoor environments, and the data for training planar region detection can be obtained automatically in some cases. In some examples, the planar regions (in 2D or 3D) can be identified by applying a machine learning model (e.g., a convolutional neural network or other neural network model) of the machine learning system 632 as a planar region detector. For example, plane detection and semantic segmentation can be performed by the machine learning system 632 using one or more CNNs to label planar regions into the defined set of semantic classes or categories (e.g., walls, floors, and a ceiling). One illustrative example of a neural network model that can be used as a planar region detector is PlaneRCNN, described in Chen Liu, et al. "PlaneRCNN: 3D Plane Detection and Reconstruction from a Single Image," in CVPR, 2019, which is hereby incorporated by reference in its entirety and for all purposes.

Planar regions that do not belong to one of the semantic classes in the defined set can be discarded (e.g., by the plane detection engine 630), such as planar regions corresponding to furniture, books, plants, and/or other objects. For example, parts of a room not belonging to the room layout classes (e.g. furniture, plants, etc.) can be labeled as clutter and are not considered as part of the layout.

Depth information can be obtained, and can be used by the parameter determination engine 634 for the calculation of parameters (e.g., 3D parameters) of the layout planes determined by the plane detection engine 630. As noted above, the parameters of a plane can include a normal vector of the plane (e.g., a vector orthogonal to the plane) and/or a plane offset of the plane. The depth information can be inferred from a single color image using machine learning techniques, or can be obtained from the one or more depth sensors 602 (e.g., represented in one or more RGBD images) which can provide more reliable information. A geometric reasoning process can be performed and can include finding plane intersections to construct hypotheses for room layouts in 3D, which can be verified and refined. For instance, the corners and edges for the 3D room layout can be determined by intersecting the 3D layout planes. The techniques described herein are applicable to various types of environments with a defined structure (e.g., a structure defined by one or more floors, ceilings, walls, and/or other objects), such as general room layouts. The layout estimation techniques described herein are not limited to box-like layouts, as is the case for a number of the approaches discussed above.

As not every intersection is a valid layout corner, combining "candidate" edges can result in multiple possible polygons for every layout plane. The final set of polygons for the layout planes is the one that minimizes discrepancy in 3D, comparing to extracted depth information, and in 2D, maximizing the overlap of polygons with corresponding planar regions of the layout.

The layout estimation techniques described herein allow room (or other environment) layout edges and corners, which are not directly visible in the image (e.g. they are obstructed by furniture), to be recovered. The 3D layout 638 includes a final room layout in 3D that is modeled as a set of 3D planes and corresponding polygons (e.g., after a verification and refinement stage). Such a representation allows for efficient 3D visualization and generation of floor plans, among other uses.

Figure 6B:
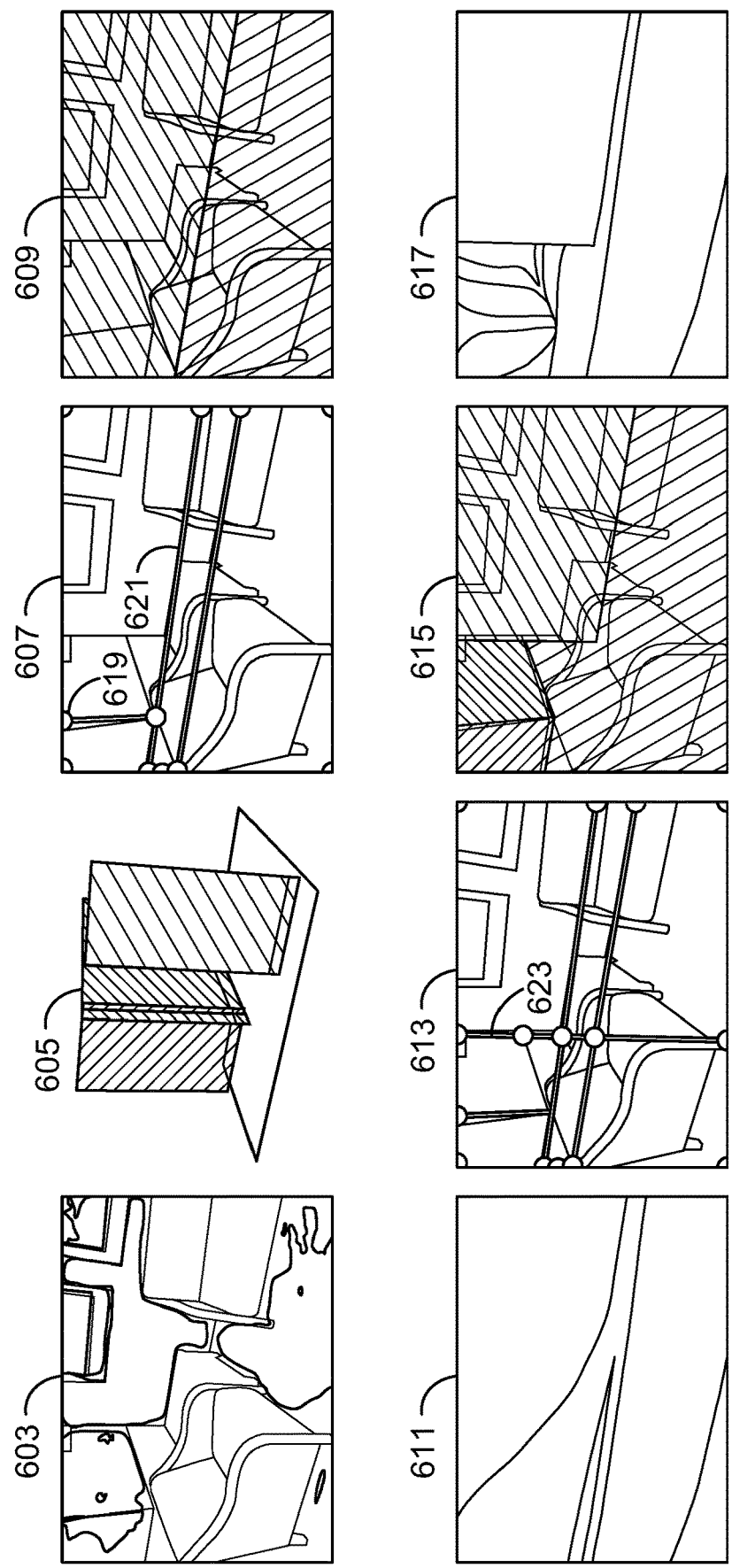
FIG. 6B is a diagram illustrating an overview of an example layout estimation approach performed by the layout estimation system of FIG. 6A, in accordance with some examples.
Figure 7:
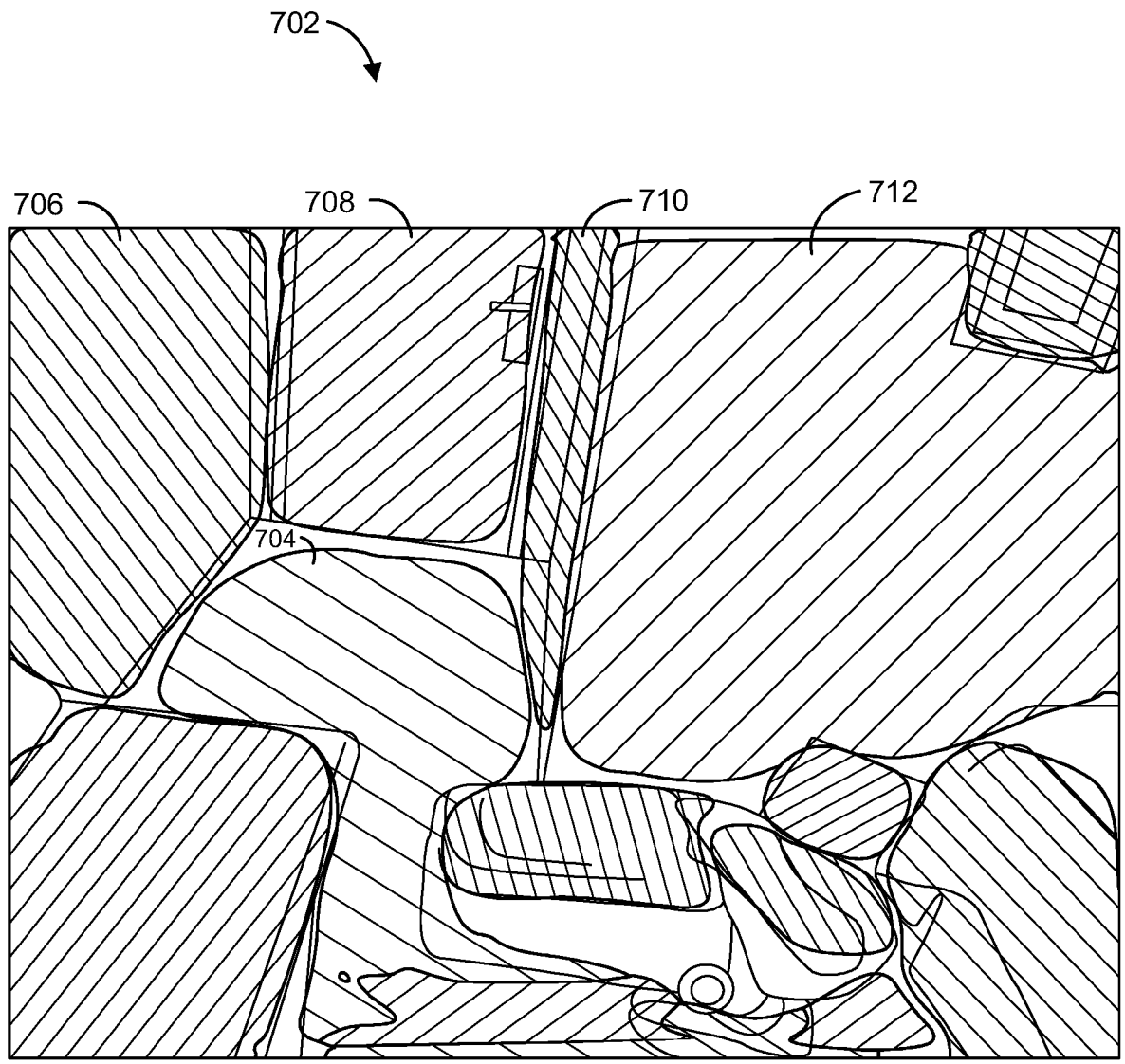
FIG. 7 is an image illustrating detected layout components and a semantic segmentation of the layout components of a room, in accordance with some examples.

FIG. 6B is a diagram including various images 603 through 617 that illustrate an overview of an example layout estimation approach that can be performed by the layout estimation system 600. As shown in image 603, 2D planar regions corresponding to layout components (walls, floors, ceilings) in an input image are detected (e.g., using Plane-RCNN or other technique) and a semantic segmentation is generated (e.g., using, DeepLabv3+, or other technique). The 2D planar regions can be detected by the plane detection engine 630. DeepLabv3+ is described in Liang-Chieh Chen, et al., "Encoder-Decoder with Atrous Separable Convolution for Semantic Image Segmentation," in ECCV, 2018, which is hereby incorporated by reference in its entirety and for all purposes. FIG. 7 is a diagram of another image illustrating detected 2D planar regions detected by a plane detection tool (e.g., PlaneRCNN or other plane detection tool). The plane detection tool can be implemented by the one or more machine learning systems 632. In image 702 of FIG. 7, different hatched regions indicate different planar regions. In image 603 of FIG. 6B, different layout components are also shown. For example, in the image 702 of FIG. 7, the floor is illustrated with a hatched pattern 704, a first side wall (on the left side of the picture from the camera perspective) is shown with a hatched pattern 706, a back wall is shown with a hatched pattern 708, a second side wall (on the right side of the picture from the camera perspective) is shown with a hatched pattern 710, and a front wall is shown with a hatched pattern 712. Various other objects in the room are shown with other patterns.

Figure 8:
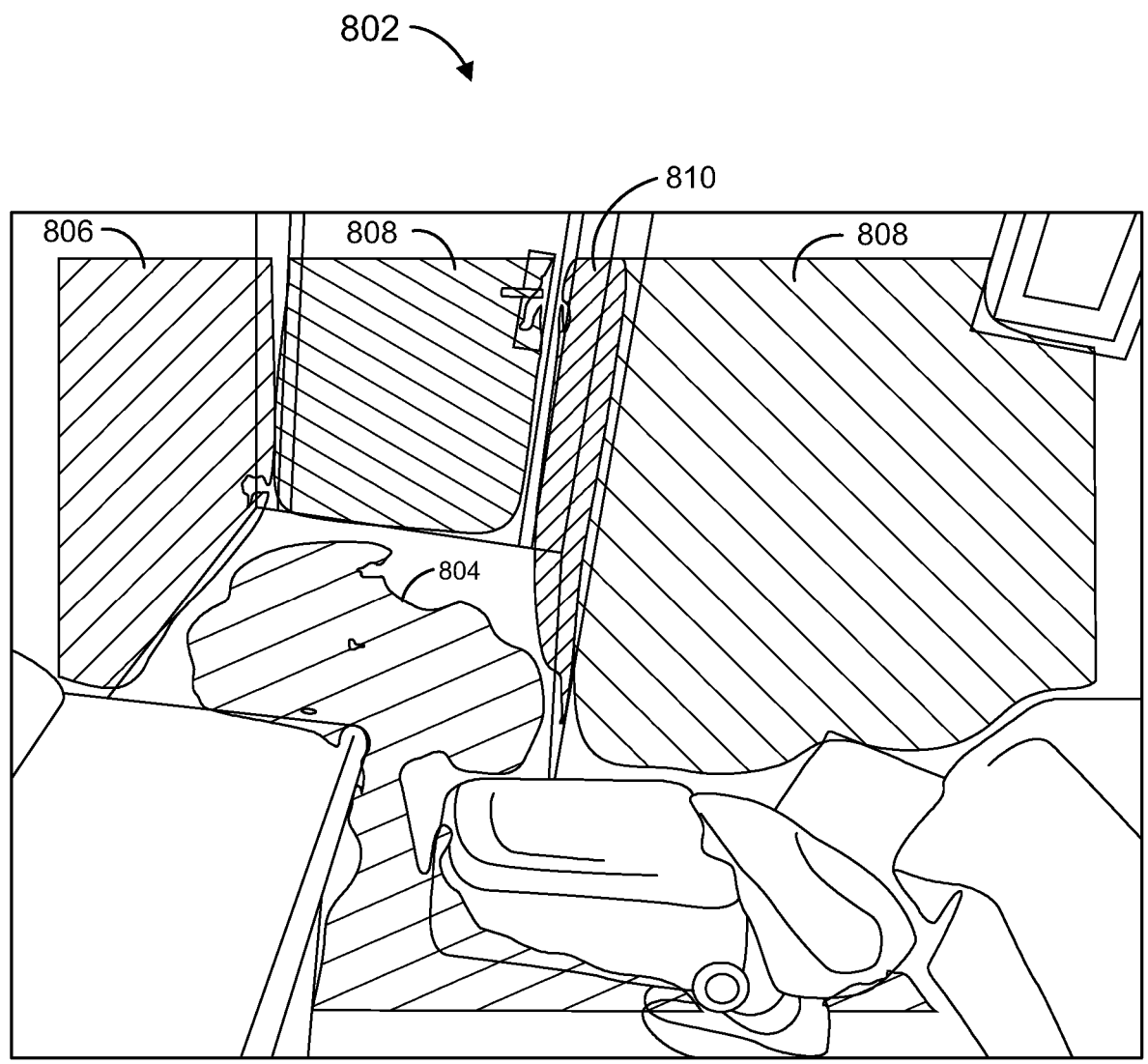
FIG. 8 is an image illustrating plane filtering that can be performed to filter certain planes from a set of planes used for layout estimation, in accordance with some examples.

FIG. 8 is an image 802 illustrating the plane filtering that can be performed. For example, as described above, after the semantic segmentation, the planes that do not belong to any of the defined layout classes or categories can be filtered out. The classes used in the example of FIG. 8 include a class for floor, a class for wall, and a class for ceiling. As shown, all segmented layout components from FIG. 7 are removed in the image 802 of FIG. 8, except for the floor (shown with a hatched pattern 804 in FIG. 8) and the walls (shown with hatched patterns 806, 808, and 810 in FIG. 8). The different hatched patterns shown in FIG. 8 indicate the direction of the normal vectors of the various planes. As shown, the back wall and the front wall are shown with a same hatched pattern 808.

Referring again to FIG. 6B, the image 605 illustrates the 3D planes resulting from determining and/or obtaining 3D parameters (e.g., 3D parameter equations) of the corresponding 3D planes. As noted above, the parameters of the 3D planes can be determined by the parameter determination engine 634 using depth information. For instance, the approach can be applied using RGB and/or RGBD images. For RGBD images, the depth information is given with the images. For instance, an RGBD image includes a combination of an RGB image and a corresponding depth image (or depth map). A depth image (or depth map) is an image channel in which each pixel relates to a distance between the image plane and the corresponding object in the RGB image. For RGB images, the depth can be estimated, such as using a neural network, as described below. In some examples, planes with similar parameters are merged.

Figure 9:
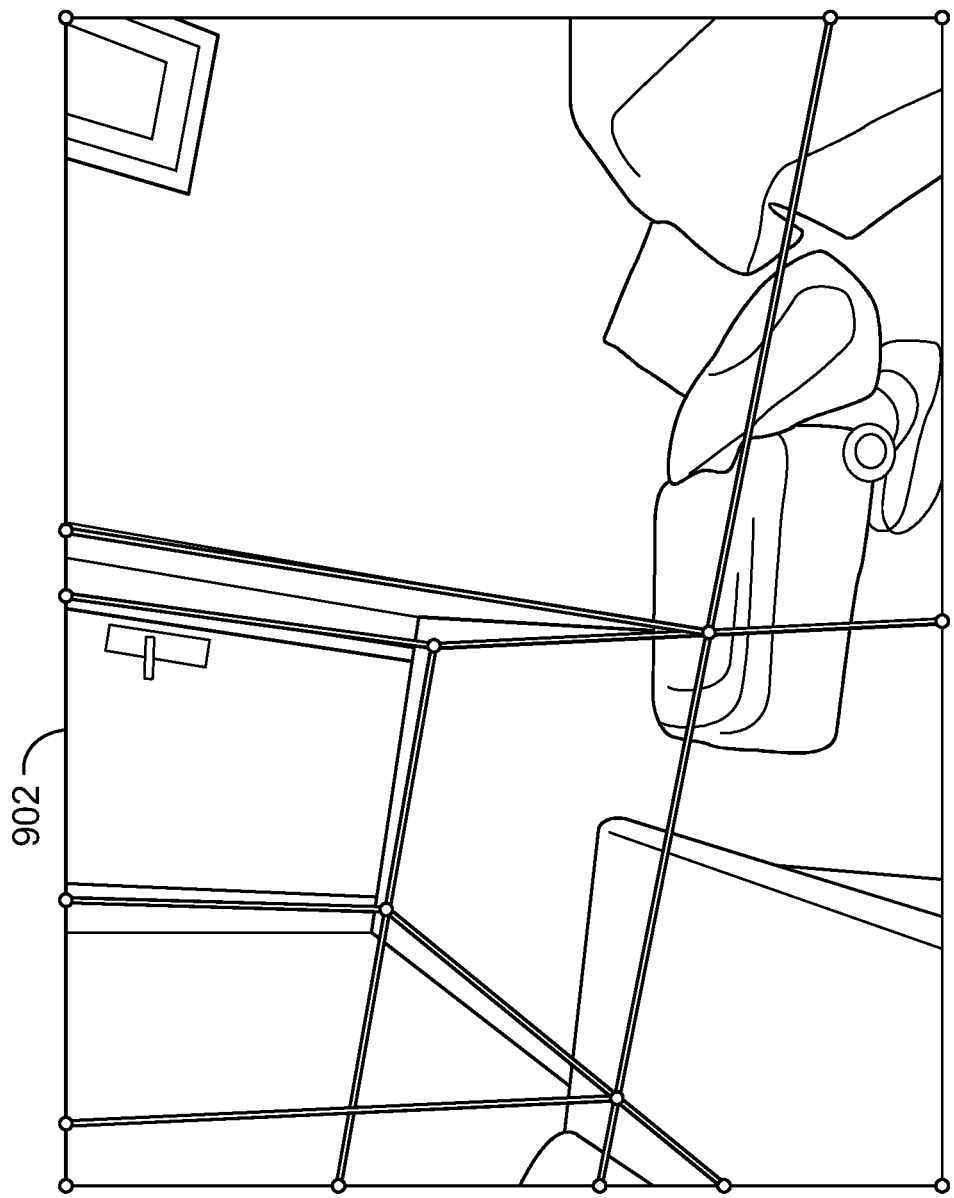
FIG. 9 is an image illustrating candidate edges and vertices for a final layout, in accordance with some examples.

As illustrated in image 607 of FIG. 6B, intersections between the planes (e.g., the planes remaining after plane filtering is performed) are determined. As shown, the intersections between the planes provide a set of candidate edges (and in some cases candidate vertices or corners) for the final layout (e.g., 3D layout 638). The edges are shown as lines (e.g., edge 621), and the vertices are shown as dots (e.g., corner 619). Intersecting the layout planes (and camera frustum planes on the boundary of the image) can be used to determine the candidate layouts. For instance, intersection of three different planes can provide a candidate layout vertex (or corner), and an intersection of two different planes can provide a candidate layout edge. FIG. 9 is another image 902 illustrating candidate edges and vertices for a final layout. In some cases, the intersections between the planes, the candidate edges, and the candidate vertices can be determined by the polygon determination engine 636.

Based on the candidate edges, a first estimate of the layout (shown in image 609) can be determined. In some cases, a set of polygons can be determined that describe the layout. The polygons can be determined by the polygon determination engine 636, as noted above. For instance, candidate polygons for each of the planes can be defined through the sets of candidate vertices and candidate layout edges of the respective planes. For each plane, the best fitting polygon is selected as the polygon that meets certain constraints described below (e.g., a polygon that best matches the corresponding plane segmentation, has the least amount of intersections with other polygons, and/or has an appropriate depth with respect to other layout components in the image). In some examples, missing edges can be detected (e.g., missing edge 623 shown in image 613) from the differences in depth for the 3D layout estimate (shown in image 611) and the input image. In such examples, the missing edges can be added to the set of candidate edges, as shown in image 613. Based on the addition of the missing candidate edges, another estimate of the layout (not shown) can be determined. This process can be iterated until a layout is determined that corresponds to the input image and that is consistent in 3D. A final 3D layout is shown in image 615. Image 617 illustrates the 3D layout estimate for the updated 3D layout in image 615, which is consistent in 3D with the input image.

Figure 10:
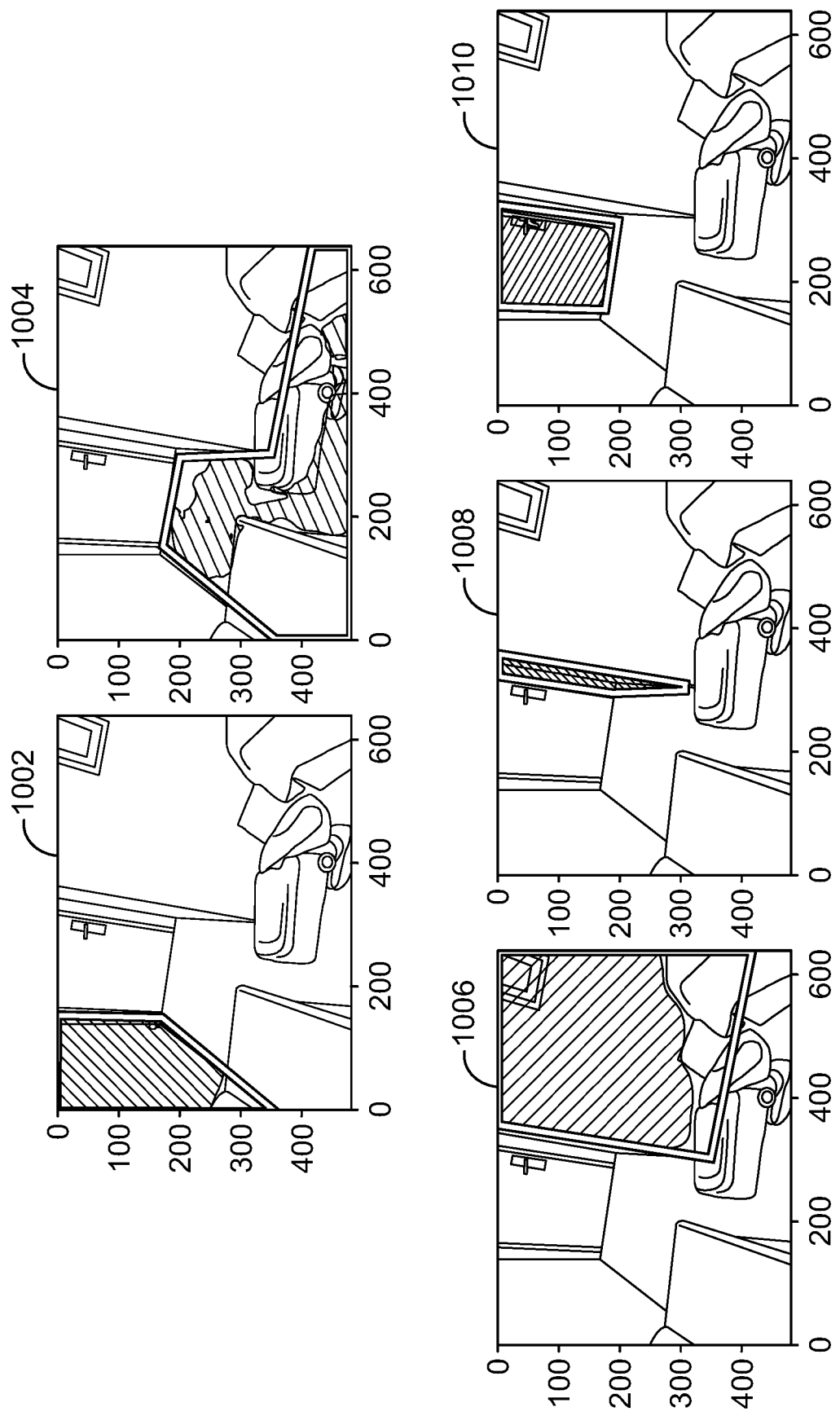
FIG. 10 is a set of images illustrating a visualization of a final set of polygons for valid layout planes shown in FIG. 9, in accordance with some examples.

FIG. 10 is a set of images 1002 through 1010 illustrating a visualization of a final set of polygons for every valid layout plane shown in FIG. 9. For the segmented planes (shown in red), the set of polygons (shown in green) is determined that meets the constraints described below. For example, in some cases, a set of polygons can be determined that match the corresponding planes segmentations, where no polygons (or a least amount of polygons) in the set intersect each other, and/or where the polygons have an appropriate depth with respect to other layout components in the image (e.g., a wall layout component is located behind one or more furniture layout components). Image 1002 illustrates the polygon (outlined with a green line) generated for the left wall shown in red (from the perspective of the camera). Image 1004 illustrates the polygon (outlined with a green line) generated for the floor shown in red. Image 1006 illustrates the polygon (outlined with a green line) generated for the front wall shown in red. Image 1008 illustrates the polygon (outlined with a green line) generated for the right wall shown in red (from the perspective of the camera). Image 1010 illustrates the polygon (outlined with a green line) generated for the back wall shown in red.

Figure 11B:
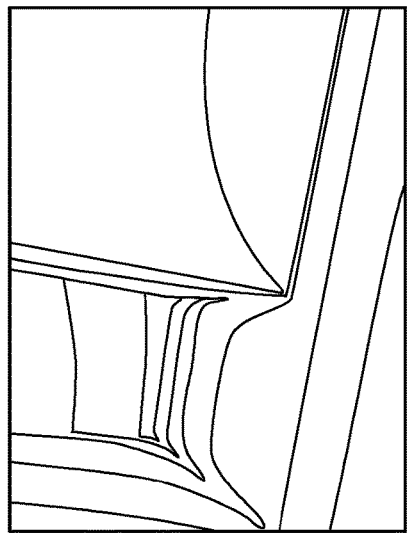
FIG. 11A, FIG. 11B, and FIG. 11C is a set of images illustrating an example room layout, corresponding room layout depth, and a resulting 3D reconstructed layout, in accordance with some examples.
Figure 11C:
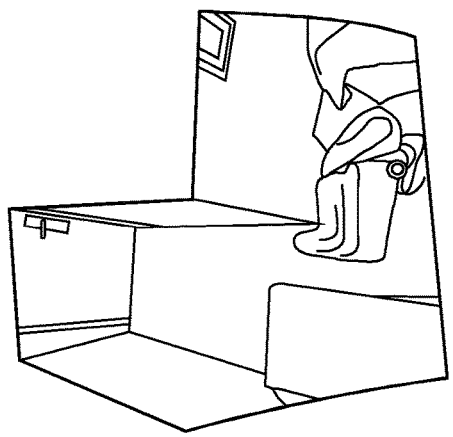
Figure 11A:
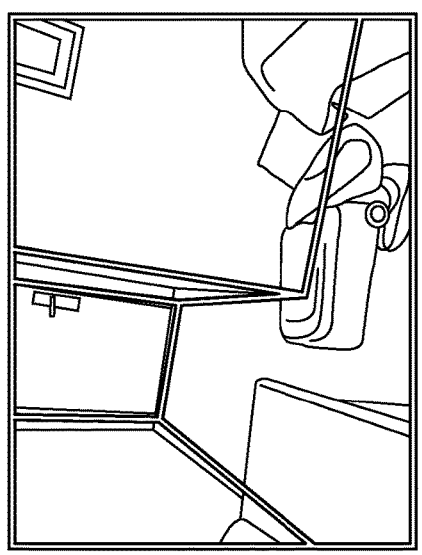
Figure 12B:
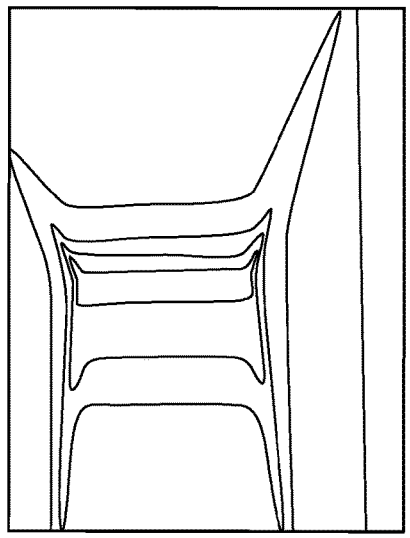
FIG. 12A, FIG. 12B, and FIG. 12C is a set of images illustrating another example room layout, corresponding room layout depth, and a resulting 3D reconstructed layout, in accordance with some examples.
Figure 12C:
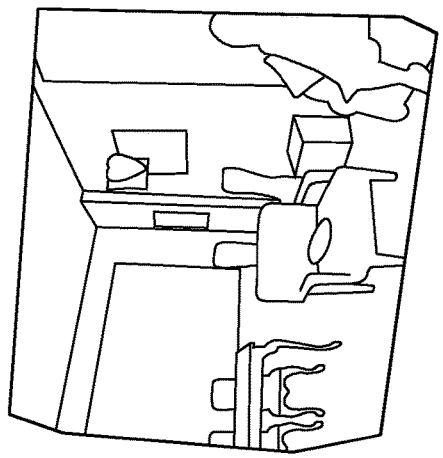
Figure 12A:
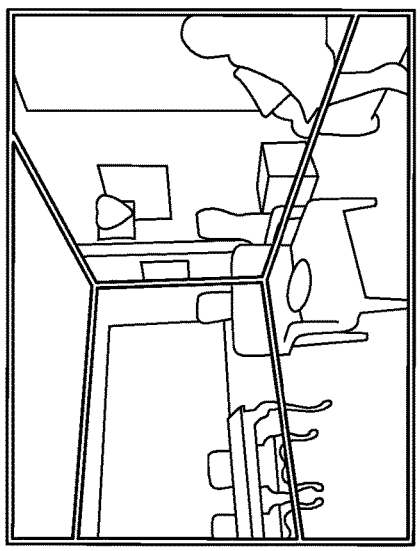
Figure 13B:
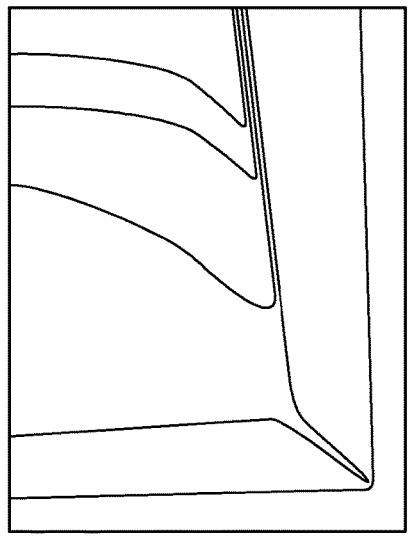
FIG. 13A, FIG. 13B, and FIG. 13C is a set of images illustrating another example room layout, corresponding room layout depth, and a resulting 3D reconstructed layout, in accordance with some examples.
Figure 13C:
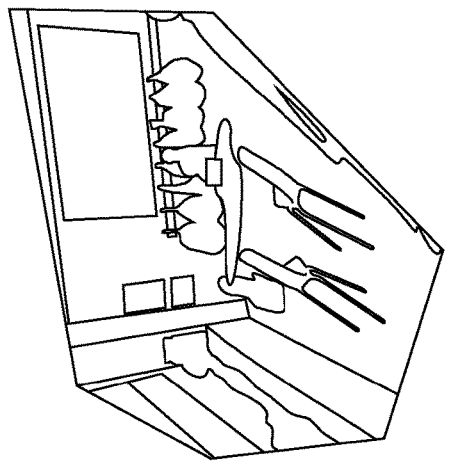
Figure 13A:
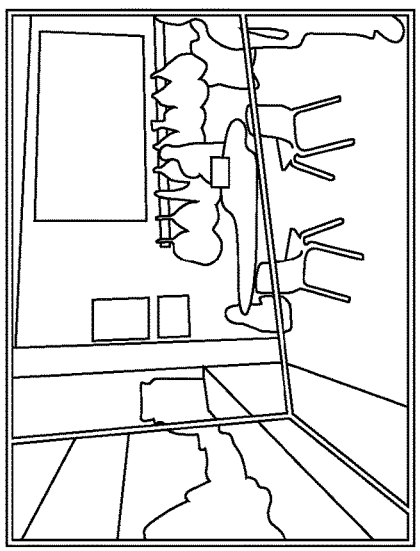

FIG. 11A, FIG. 11B, and FIG. 11C are images illustrating an example room layout (FIG. 11A), corresponding room layout depth (FIG. 11B), and a resulting 3D reconstructed layout (FIG. 11C). FIG. 12A, FIG. 12B, and FIG. 12C are images illustrating another example of a room layout (FIG. 12A), corresponding room layout depth (FIG. 12B), and a resulting 3D reconstructed layout (FIG. 12C). FIG. 13A, FIG. 13B, and FIG. 13C are images illustrating another example of a room layout (FIG. 13A), corresponding room layout depth (FIG. 13B), and a resulting 3D reconstructed layout (FIG. 13C).

A detailed illustrative example of a layout estimation technique that can be performed by the layout estimation engine 600 will now be provided. The description below first formalizes the general layout estimation problem as a constrained discrete optimization problem, then explains how a first set of candidate polygons are generate from plane intersections, and then explains how an initial subset of polygons that define the layout is found. When one or more walls are hidden in the image, this results in an imperfect layout. It is explained below how to augment the set of candidate polygons to take into account these hidden walls, and iterate until the final layout is determined.

The layout estimation system 600 can receive an input image I (not shown in FIG. 6), and can process the input image I to generate an estimated 3D layout of an environment (e.g., a 3D layout of a room). In some examples, the input image I can include an RGB image or an RGBD image. In some cases, the image source for the input image (e.g., the one or more image sensors 604 such as a camera, the one or more depth sensors 602, storage 606, and/or other component or device) can be part of the same computing device as the layout estimation system 600, as shown in FIG. 6. In some examples, the layout estimation system and the image source can be part of separate computing devices (e.g., the image source can be part of a separate device with one or more cameras and/or depth sensors, a storage device, or other device).

The problem of estimating a 3D polygonal layout $\hat{R}$ for the given input image I can be formalized as solving a constrained discrete optimization problem, such as the following:

$$\hat{R} = \arg\min_{X \subset \mathcal{R}_0(I)} c(X, I) \text{ such that} \qquad \text{Equation (1)}$$

$$\begin{cases} \bigcup_{R \in X} p(R) = I, \text{ and} \\ \forall (R_1, R_2) \in X^2 R_1 \neq R_2 \Rightarrow p(R_1) \cap p(R_2) = \emptyset, \end{cases}$$

where c(X, I) is a cost function defined below, $\mathcal{R}_0(I)$ is a set of 3D polygons for image I, and p($R$) is the projection in the image of polygon R (e.g., p(R $R_1$) is the projection in the image of polygon $R_1$, p($R_2$) is the projection in the image of polygon $R_2$, and so on). Using Equation (1), the layout estimation system 600 can determine the subset of polygons in $\mathcal{R}_0(I)$ for which projections (p($R$)) partition the input image, and that minimizes cost function c( ).

To solve the layout problem, two options can be used when defining precisely c(X, I) and $\mathcal{R}_0(I)$. In a first example, $\mathcal{R}_0(I)$ can be defined to include the set of all possible 3D polygons, and c(X, I) includes constraints to ensure that the polygons in X reproject on image cues for the edges and corners of the rooms. In a second example, $\mathcal{R}_0(I)$ can be defined to include only polygons with edges that correspond to edges of the environment (e.g., the edges of a room). As previously discussed, extracting wall edges and corners from images can be difficult in general, for example because of the lack of training data. Based on such difficulty, the second example can be used, where $\mathcal{R}_0(I)$ includes polygons with edges that correspond to edges of the environment. How the set $\mathcal{R}_0(I)$ of candidate 3D polygons is generated (which includes the polygons constituting the 3D layout) and the cost function c(X,I) are described below.

As noted above, the layout estimation system 600 can generate a set of candidate 3D polygons $R_0(I)$. The intersection of planes can be used to identify edge candidates defining the polygons of the layout. These edges can be grouped into polygons to create $R_0(I)$.

The layout estimation system 600 can determine a first estimate $P_0$ of the set of planes on which the polygons lie by detecting planar regions (e.g., with Plane-RCNN or other plane detection tool) and keeping the regions that correspond to certain defined classes or categories (e.g., walls, ceilings, and floors), according to a semantic segmentation of the image (e.g., obtained using DeepLabv3+, or other semantic segmentation tool). The plane detection tool can be implemented by the one or more machine learning system 632 in some examples. In some cases, the plane detection tool (e.g., Plane-RCNN or other tool) can provide the 3D parameter equations of the 3D planes it detects. The 3D planes parameters can be as given:

$$n_1 x + n_2 y + n_3 z + d = 0 \qquad \text{Equation (2)}$$

where ($n_1$, $n_2$, $n_3$) are components of a normal vector, d is the plane offset, and (x, y, z) are the arbitrary coordinates of a 3D coordinate space. As noted above, in some cases, the 3D parameters can be determined from a depth map (e.g., from an RGBD image) or can be determined from an RGB image (or other type of image) using machine learning techniques (e.g. "big-to-small" (BTS), or other technique). BTS is described in Lee, Jin Han, et al. "From Big to Small: Multi-Scale Local Planar Guidance for Monocular Depth Estimation," in arXiv preprint arXiv:1907.10326, 2019, which is hereby incorporated by reference in its entirety and for all purposes. If a depth map of the image is available, a 3D plane can be fit to each detected planar region to obtain more accurate parameters. As can be seen in image 603 of FIG. 6B, the segmented regions provided jointly by the plane detection tool (e.g., Plane-RCNN) and semantic segmentation tool (e.g. DeepLabv3+) may not extend to the full polygonal regions that constitute the layout. To find these polygons, the layout estimation system can determine the intersections of the planes in $P_0$, as described below. In order to limit the extension of the polygons to the borders of the input image I, the four 3D planes of the camera frustum can be included in $P_0$. The planes of the camera frustum include the planes passing through two neighboring image corners and the camera center (e.g., the center of the image I).

In some cases, the planes required to create one or more edges of the layout may not be in this first set of planes $P_0$. For example, referring to FIG. 6B, the plane of the hidden wall on the left of the scene in image 603 is not included in the first set of planes $P_0$ (as illustrated by the image 607 in FIG. 6B). Through an analysis-by-synthesis approach, the layout estimation system 600 can detect the absence of such planes, and can add plausible planes to recover the missing edges and obtain the correct layout. The analysis-by-synthesis approach will be described below.

By computing the intersections of each triplet of planes in $P_0$, the layout estimation system 600 can obtain a set $C_0$ of candidate 3D corners for the room layout. To build a structured layout, it can be important to keep track of the planes that generated the corners. Each corner $C_j \epsilon C_0$ can be represented by a set of three different planes, for example as follows:

$$C_j = \{P_j^1, P_j^2, P_j^3\}, \qquad \text{Equation (3)}$$

where $P_j^1 \epsilon P_0$, $P_j^2 \epsilon P_0$, $P_j^3 \epsilon P_0$, and $P_j^1 \neq P_j^2$, $P_j^1 \neq P_j^3$, and $P_j^2 \neq P_j^3$. For numerical stability, the layout estimation system 600 may not consider cases where at least two planes are almost parallel, or when the three planes almost intersect on a line. In some cases, the layout estimation system 600 can discard the corners that reproject outside the image and those that are behind the depth map for the input image, as such corners are not visible and thus will not be part of the visible layout. The layout estimation system 600 can also discard corners that have negative depth values, as such corners likely do not correspond to valid corners.

The layout estimation system 600 can then obtain a set $\varepsilon_0$ of candidate 3D edges by pairing the corners in $C_0$ that share exactly two planes, for example as follows:

$$E_k = \{C_{\sigma(k)}, C_{\sigma'(k)}\}, \quad \text{Equation (4)}$$

where $\sigma(k)$ and a $\sigma'(k)$ are two functions giving the indices of the corners that are the extremities of edge $E_k$. The image 607 in FIG. 6B illustrates an example of such a set of candidate edges (shown as lines between dots, the dots representing the corners or vertices).

The layout estimation system can create the set $\mathcal{R}_0(I)$ of candidate polygons as the set of all closed loops of edges in $\varepsilon_0$ that lie on the same plane, so that there is no intersection between two edges belonging to the same polygon.

The cost function c(X, I) from Equation (1) will now be described. In some cases, the cost function c(X, I) can be split into a 3D part and a 2D part, for example as follows:

$$c(X,I) = c_{3D}(X,I) + \lambda c_{2D}(X,I) \quad \text{Equation (5)}$$

In some implementations, $\lambda = 1$ can be used. However, one of ordinary skill will appreciate that any value of $\lambda$ can be used.

The cost function $c_{3D}(.)$ in Equation (5) measures the dissimilarity between the depth map D(I) for the input image I and the depth map D'(X) generated from the polygons in X (e.g., image 611 of FIG. 6B provides an illustrative example). The cost function $c_{3D}(.)$ is based on the observation that the layout should be located behind the objects of the scene. An example representation of the cost function $c_{3D}(.)$ is provided below:

$$c_{3D}(I, X) = \frac{1}{|I|} \sum_x \max(D(I)[x] - D'(X)[x], 0), \quad \text{Equation (6)}$$

where the sum $\Sigma_x(.)$ is over all the image locations x and $|I|$ denotes the total number of image locations.

The cost function $c_{2D}(.)$ from Equation (5) measures the dissimilarity between the polygons in the layout and the image segmentation into planar regions:

$$c_{2D}(X, I) = \sum_{R \in X} (1 - IoU(p(R), M(I, R))) + IoU(p(R), M(I) \setminus M(I, R)), \quad \text{Equation (7)}$$

where IoU is the Intersection over Union score, $p(R)$ is the projection of polygon R in the image I as in Equation (1), M(I, R) is the planar region detected by the plane detection tool (e.g., Plane-RCNN or other tool) and corresponding to the plane(s) of polygon R, and M(I) is the set of planar regions detected by the plane detection tool (e.g., Plane-RCNN or other tool) and corresponding to layout components.

In some implementations, optimization can be performed by the layout estimation system 600. For example, to find the solution to the constrained discrete optimization problem introduced in Equation (1), the layout estimation system 600 can consider all the possible subsets X in $\mathcal{R}_0(I)$ that pass the constraints, and keep the one that minimizes the cost function c(X, I).

The number N of polygons in $\mathcal{R}_0(I)$ varies with the scene. For example, with reference to the example shown in FIG. 6B, 21 candidate polygons in total can be obtained. The number of non-empty subsets to evaluate is theoretically $2^{(N-1)}$, which is slightly higher than $10^6$ for the same example. In some cases, most of the non-empty subsets can be trivially discarded. For instance, considering that only one polygon per plane is possible significantly reduces the number of possibilities (to 351 in this example). The number can be further reduced by removing the polygons that do not have a plausible shape to be part of a room layout. Such shapes can be recognized by considering the distance between the non-touching edges of the polygon. Using such reduction techniques, the number N of polygons in $\mathcal{R}_0(I)$ can be reduced to 18 plausible subsets of polygons in example of FIG. 6B.

In some implementations, iterative layout refinement can be performed by the layout estimation system 600 to find the layout of the environment in the image I. For example, as noted above, it can be the case that some of the planes required to create the layout are not in $P_0$ because the planes are hidden by another layout plane. The layout estimation system 600 can detect such mistakes, and can fix them by adding a plane to $P_0$ before again performing the layout creation process described above. For instance, to detect that a plane is missing, the layout estimation system 600 can render the depth map $D'(\hat{R})$ for the current layout estimate and can measure the discrepancy of the depth map $D'(\hat{R})$ with the depth map D(I) for the image I. If the discrepancy is large, e.g. there are many pixel locations (e.g. 500 pixels, 400 pixels, 600 pixels, or other number) where the rendered depth map has values that are smaller than the values of the original depth map by some threshold (e.g. the threshold can be any suitable value, such as 0.1, 0.2, 0.3, or other value), the layout estimation system can determine (based on the discrepancy being large) that there is a mistake in the layout that can be fixed by adding one or more planes. For instance, the layout estimation system 600 can determine that layout components should not be in front of other objects in the room.

A range of planes that can improve the layout estimate can be used. In one illustrative example, a conservative option that does not introduce parts that are not visible in the input image can be used. For a polygon $R$ in $\hat{R}$ with a large difference between $D'(\hat{R})$ and D(I) (e.g., a difference larger than the threshold difference), the layout estimation system 600 can identify the image locations with the largest difference changes, and can fit a line to these points using Random sample consensus (RANSAC) or other suitable technique. RANSAC is an algorithm for robust fitting of models in the presence of data outliers. To obtain a new set of planes $P_1$, the layout estimation system 600 can add the plane P that passes through the fitted line and the camera center to $P_0$, since the intersection between P and R will create the edge missing from the layout, for example as shown in image 613 of FIG. 6A. From the new set of planes $P_1$, the layout estimation system 600 can obtain the new sets of $C_1$ (corners), $\mathcal{E}_1$ (edges), and $\mathcal{R}_1$ (polygons), and can again solve the problem of Equation (1) after replacing $\mathcal{R}_0$ by $\mathcal{R}_1$. This process can be repeated until the differences between the depth map $D'(\hat{R})$ and the depth map D(I) is not improved for the image locations segmented as layout components.

The example described above assumes that the initial estimations of the planar regions, the semantic segmentation, and the depth map are accurately (e.g., perfectly without noise) extracted from the input image I. In practice, however, this may not be the case. In some cases, various post-processing techniques can be performed to handle noisy observations (when estimations of the planar regions, the semantic segmentation, and/or the depth map are not perfectly extracted from the input image I).

For example, the pre-trained plane detection tool (e.g., the pre-trained network of Plane-RCNN) might falsely predict multiple planar regions, which can lead to multiple layout planes being detected in place of a single plane. In order to avoid this from happening, the layout estimation system 600 can merge the layout planes that are parallel and have similar plane offsets (also referred to as camera offsets), up to thresholds merge_par_thresh (for determining parallel planes) and merge_off_thresh (for determining planes with similar offsets). The merge_par_thresh and merge_off_thresh thresholds can be set to any suitable values, and can include the same value or can include different values. For example, merge_par_thresh can be set to 0.3, 0.4, or other suitable value. The merge_off_thresh threshold can be also be set to 0.3, 0.4, or other suitable value. In some cases, it is also possible that given a scene might contain multiple layout components with the same plane parameters. In such cases, the planes can be merged only if they are neighboring layout planes. Two layout planes are considered neighboring layout planes if there are no other planar regions detected by the plane detection tool in-between the two layout planes. For the merged planes, the new parameters (e.g., normal vector and/or plane offset) can be calculated as a mean of the parameters of the two planes.

In some cases, invalid depth values can be discarded from all calculations. However, in some cases, processing depths with a depth completion method is important during iterative layout refinement. An example of a depth completion method is described in Jason Ku, et al., "In Defense of Classical Image Processing: Fast Depth Completion on the CPU," in CRV, 2018, which is hereby incorporated by reference in its entirety and for all purposes. Depth holes can appear around edges in the image, which can be problematic when performing line fitting for the refinement stage, as the pixels locations with highest magnitude of change in discrepancy might be missing. Comparing depth from planes to filled depth can improve accuracy of the refined layout.

In some implementations, further improvements can be performed. For example, as noted above, plane parameters can be optimized to enforce consistency with depth, semantic boundaries, and relations between the planes (e.g. genetic algorithms). In some examples, for the use cases where a "box" layout assumption holds (for box-like rooms), the layout estimation techniques can be further relaxed and combined with other approaches that work well with a "box" shaped assumption. For example, for the RoomNet technique described above (e.g., shown in FIG. 2), plane intersections can be used to determine the key points. With respect to the Hirzer approach described above (e.g., shown in FIG. 3), the correct wall configuration can be selected based on the number of valid wall planes.

FIG. 14 illustrates an example of a process 1400 of determining one or more environmental layouts using the techniques described herein. At block 1402, the process 1400 includes detecting one or more planes in an input image of an environment. An example input image 102 of an environment is shown in FIG. 1. The one or more planes correspond to one or more objects in the input image. In some examples, the one or more planes include one or more two-dimensional planes. In some examples, the process 1400 includes detecting the one or more planes using a machine learning model, such as a convolutional neural network (CNN) trained to detect planes in images. One illustrative example of a machine learning model tool that can be used to detect planes in an image is Plane-RCNN. In some examples, the process 1400 includes detecting the one or more planes using a machine learning model and semantic segmentation. In one illustrative example, Plane-RCNN can be used to detect the one or more planes and DeepLabv3+ or other semantic segmentation technique can be used to segment the planes.

In some examples, the process 1400 includes determining one or more classes of the one or more planes. In some implementations, the one or more classes for the one or more planes are detected using a machine learning model. For instance, a classification neural network model (e.g., a CNN, such as Plane-RCNN or other machine learning model) can be used to classify the planes into different classes for which the classification neural network model is trained to detect. The process 1400 can further include selecting the one or more planes for use in generating the one or more three-dimensional polygons based on the one or more classes determined for one or more planes. For instance, using a room as an example of an environment, only planes corresponding to walls, the floor, and the ceiling are selected for use in generating the one or more three-dimensional polygons.

In some examples, the process 1400 includes detecting a plurality of planes in the input image. The plurality of planes belong to a plurality of classes. In some implementations, the plurality of classes are detected using a machine learning model. For instance, a classification neural network model (e.g., a CNN, such as Plane-RCNN or other machine learning model) can be used to classify the planes into different classes for which the classification neural network model is trained to detect. The process 1400 can further include determining, from the plurality of planes, the one or more planes belong to a subset of one or more classes from the plurality of classes. For instance, using a room as an example of an environment, the subset of classes can include a "wall" class, a "floor" class, and a "ceiling" class. The process 1400 can further include selecting the one or more planes for use in generating the one or more three-dimensional polygons based on the one or more planes belonging to the subset of one or more classes. The process 1400 can further include and discarding at least plane of the plurality of planes that belongs to at least one class other than the subset of one or more classes. For instance, using the example from above with a room as an example of an environment, only planes corresponding to walls, the floor, and the ceiling are selected for use in generating the one or more three-dimensional polygons, and the planes corresponding to other classes of objects or layout components can be discarded.

At block 1404, the process 1400 includes determining one or more three-dimensional parameters of the one or more planes. In some examples, the one or more three-dimensional parameters include a normal vector and a plane offset for each plane of the one or more planes. In some examples, normal vector for a plane is represented by a vector that is orthogonal to the plane. In some examples, a plane offset for a plane indicates a distance of the plane from a camera.

In some examples, the process 1400 includes obtaining depth information associated with the one or more planes. In some implementations, the depth information is obtained from one or more depth sensors. For instance, the depth information from the one or more depth sensors can be included in a depth map or depth image of an RGBD image, as described above. In some implementations, the depth information is determined using a machine learning model, as described above. The process 1400 can further include determining the one or more three-dimensional parameters of the one or more planes using the depth information.

At block 1406, the process 1400 includes determining one or more polygons using the one or more planes and the one or more three-dimensional parameters of the one or more planes. In some examples, the one or more polygons include one or more three-dimensional polygons. At block 1408, the process 1400 includes determining a three-dimensional layout of the environment based on the one or more polygons.

In some examples, the process 1400 includes determining, using the three-dimensional parameters of the one or more planes, intersections between planes of the one or more planes. The process 1400 can further include determining a candidate set of one or more polygons based on the intersections between the planes. The process 1400 can further include determining a final set of one or more polygons from the candidate set of one or more polygons. The process 1400 can further include determining the three-dimensional layout of the environment using the final set of one or more polygons.

In some examples, determining the final set of one or more polygons from the candidate set of one or more polygons is based on a comparison of each polygon from the candidate set of one or more polygons to at least one of depth information, the detected one or more planes, and at least one other polygon from the candidate set of one or more polygons.

For instance, the process 1400 can include determining, based on the one or more three-dimensional parameters, a polygon from the candidate set of one or more polygons is a greater distance from a camera than at least one object in the environment. The process 1400 can include discarding the polygon from the candidate set of one or more polygons based on the determination that the polygon is further from the camera than the at least one object in the environment.

In another example, the process 1400 can include comparing a polygon from the candidate set of one or more polygons to at least one plane from the detected one or more planes. The process 1400 can include discarding the polygon from the candidate set of one or more polygons when the polygon differs from the at least one plane by a threshold amount.

In another example, the process 1400 can include discarding a polygon from the candidate set of one or more polygons when the polygon intersects with at least one other polygon from the candidate set of one or more polygons.

In some examples, the process 1400 includes generating an output image based on the three-dimensional layout of the environment.

In some examples, the process 1400 includes generating a three-dimensional model representing the three-dimensional layout of the environment.

In some examples, the process 1400 includes receiving a user input to manipulate the three-dimensional model, and adjusting at least one of a pose, a location, and/or a property of the three-dimensional model in an output image based on the user input. In one example, the process 1400 can receive user input requesting movement of the scene (represented by the 3D model) from a first location (and/or from a first pose) to a second location (and/or to a second pose). In response, the process 1400 can adjust the location of the 3D model from the first location (and/or from the first pose) to the second location (and/or to the second pose) in an output image.

In some examples, at least one of the pose, the location, and/or the property of the three-dimensional model is adjusted based on semantic information defined for the three-dimensional model. For instance, data can be provided for a 3D model that defines semantic information for the 3D model. The semantic properties defined by the data can allow a user to interact with the 3D model through a user interface. In such cases, at least one of the pose, the location, and/or the property of the selected three-dimensional model can be adjusted based on the semantic information defined for the selected 3D model. The property of the 3D model can include an appearance of the 3D model (e.g., texture, color, sheen, reflectance, among others), physical movement of the 3D model (e.g., a range of possible movements, an amount the 3D model can be manipulated, such as stretched and/or compressed, among others), actions that can be performed the 3D model (e.g., a 3D model of glass that can be broken or shattered, among others), items included in the environment represented by the 3D model (e.g., furniture, plants, people, animals, paintings and/or other items on a wall and/or other surface of the environment, among others), any combination thereof, and/or other semantic properties.

In some examples, the process 1400 may be performed by a computing device or an apparatus, such as a computing device implementing the layout estimation system 600. In one example, the computing device can have the computing device architecture 1500 shown in FIG. 15, which can also include the layout estimation system 600. In some cases, the computing device or apparatus may include one or more input devices, one or more output devices, one or more processors, one or more microprocessors, one or more microcomputers, and/or other component(s) that is/are configured to carry out the steps of process 1400. In some examples, the computing device or apparatus may include a camera configured to capture images. For example, the computing device may include a camera device. As another example, the computing device may include a mobile device with a camera (e.g., a mobile phone or tablet including a camera, or other type of device with a camera). In some cases, the computing device can include one or more communications transceivers and/or one or more video codecs. In some cases, the computing device may include a display for displaying images. In some examples, a camera or other capture device that captures the video data is separate from the computing device, in which case the computing device receives the captured video data. The computing device may further include a network interface configured to communicate the video data. The network interface may be configured to communicate Internet Protocol (IP) based data or any other suitable data.

The components of the computing device (e.g., the one or more processors, one or more microprocessors, one or more microcomputers, and/or other component) can be implemented in circuitry. For example, the components can include and/or can be implemented using electronic circuits or other electronic hardware, which can include one or more programmable electronic circuits (e.g., microprocessors, graphics processing units (GPUs), digital signal processors (DSPs), central processing units (CPUs), and/or other suitable electronic circuits), and/or can include and/or be implemented using computer software, firmware, or any combination thereof, to perform the various operations described herein.

The process 1400 is illustrated as a logical flow diagram, the operation of which represent a sequence of operations that can be implemented in hardware, computer instructions, or a combination thereof. In the context of computer instructions, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular data types. The order in which the operations are described is not intended to be construed as a limitation, and any number of the described operations can be combined in any order and/or in parallel to implement the processes.

Additionally, the process 1400 may be performed under the control of one or more computer systems configured with executable instructions and may be implemented as code (e.g., executable instructions, one or more computer programs, or one or more applications) executing collectively on one or more processors, by hardware, or combinations thereof. As noted above, the code may be stored on a computer-readable or machine-readable storage medium, for example, in the form of a computer program comprising a plurality of instructions executable by one or more processors. The computer-readable or machine-readable storage medium may be non-transitory.

Figure 15:
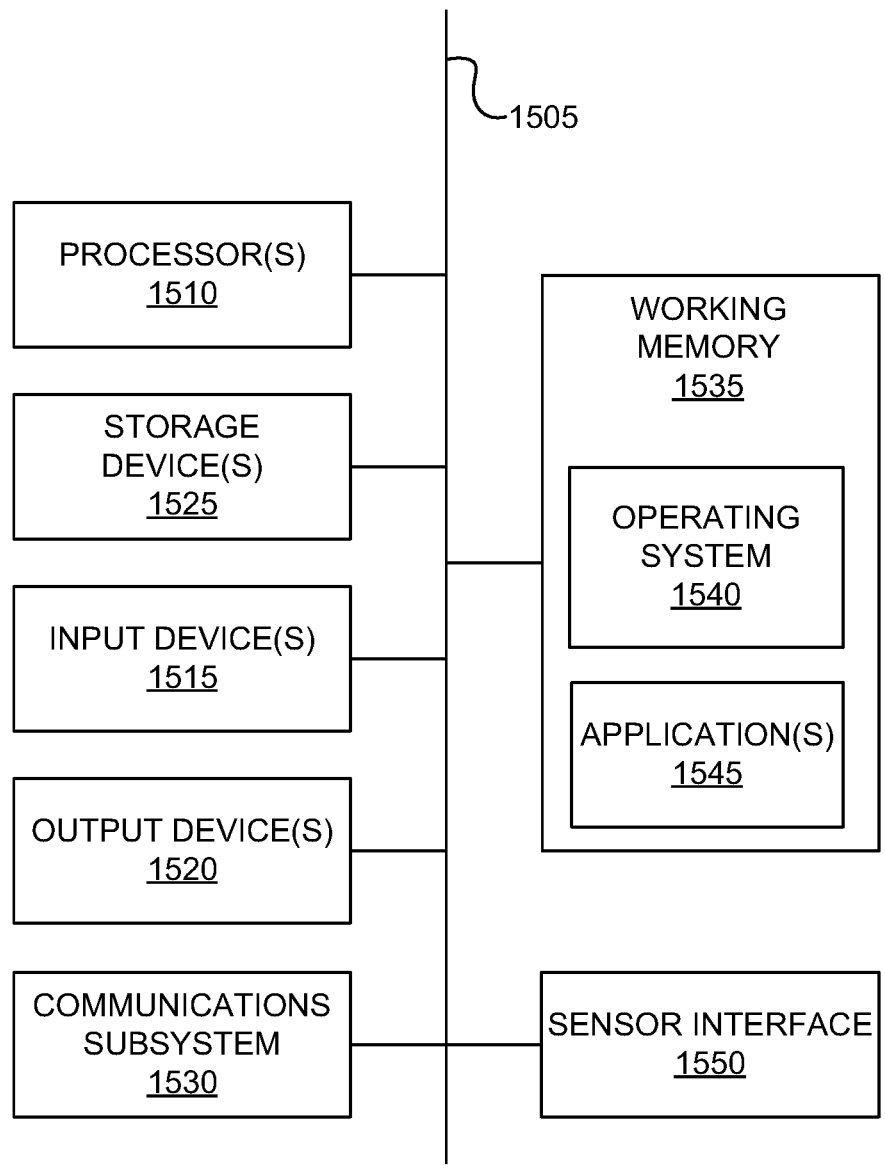
FIG. 15 illustrates an example of a computing system in which one or more embodiments may be implemented.

FIG. 15 illustrates an example computing device 1500 incorporating parts of a computing device that can be used to performing one or more of the techniques described herein. A computing device as illustrated in FIG. 15 may be incorporated as part of any computerized system, such as the layout estimation system 600. In some examples, the computing device 1500 may represent some of the components of a mobile device, or a computing device executing the layout estimation system 600 described herein or related tool. Examples of a computing device 1500 include, but are not limited to, desktops, workstations, personal computers, supercomputers, video game consoles, tablets, smartphones, laptops, netbooks, or other portable devices. FIG. 15 provides a schematic illustration of one embodiment of a computing device 1500 that may perform the methods provided by various other embodiments, as described herein, and/or may function as the host computing device, a remote kiosk/terminal, a point-of-sale device, a mobile multifunction device, a set-top box and/or a computing device. FIG. 15 is meant only to provide a generalized illustration of various components, any or all of which may be utilized as appropriate. FIG. 15, therefore, broadly illustrates how individual system elements may be implemented in a relatively separated or relatively more integrated manner.

The computing device 1500 is shown comprising hardware elements that may be electrically coupled via a bus 1505 (or may otherwise be in communication, as appropriate). The hardware elements may include one or more processors 1510, including without limitation one or more general-purpose processors and/or one or more special-purpose processors (such as digital signal processing chips, graphics acceleration processors, and/or the like); one or more input devices 1515, which may include without limitation a camera, sensors 1550, a mouse, a keyboard and/or the like; and one or more output devices 1520, which may include without limitation a display unit, a printer and/or the like.

The computing device 1500 may further include (and/or be in communication with) one or more non-transitory storage devices 1525, which may comprise, without limitation, local and/or network accessible storage, and/or may include, without limitation, a disk drive, a drive array, an optical storage device, a solid-form storage device such as a random access memory ("RAM") and/or a read-only memory ("ROM"), which may be programmable, flash-updateable and/or the like. Such storage devices may be configured to implement any appropriate data storage, including without limitation, various file systems, database structures, and/or the like.

The computing device 1500 might also include a communications subsystem 1530. The communications subsystem 1530 may include a transceiver for receiving and transmitting data or a wired and/or wireless medium. The communications subsystem 1530 may also include without limitation a modem, a network card (wireless or wired), an infrared communication device, a wireless communication device and/or chipset (such as a Bluetooth™ device, an 802.11 device, a WiFi device, a WiMax device, cellular communication facilities, etc.), and/or the like. The communications subsystem 1530 may permit data to be exchanged with a network (such as the network described below, to name one example), other computing devices, and/or any other devices described herein. In many embodiments, the computing device 1500 will further comprise a non-transitory working memory 1535, which may include a RAM or ROM device, as described above.

The computing device 1500 may comprise software elements, shown as being currently located within the working memory 1535, including an operating system 1540, device drivers, executable libraries, and/or other code, such as one or more application programs 1545, which may comprise computer programs provided by various embodiments, and/or may be designed to implement methods, and/or configure systems, provided by other embodiments, as described herein. Merely by way of example, one or more procedures described with respect to the method(s) discussed above might be implemented as code and/or instructions executable by a computer (and/or a processor within a computer); in an aspect, then, such code and/or instructions may be used to configure and/or adapt a general purpose computer (or other device) to perform one or more operations in accordance with the described methods.

A set of these instructions and/or code might be stored on a computer-readable storage medium, such as the storage device(s) 1525 described above. In some cases, the storage medium might be incorporated within a computing device, such as computing device 1500. In other embodiments, the storage medium might be separate from a computing device (e.g., a removable medium, such as a compact disc), and/or provided in an installation package, such that the storage medium may be used to program, configure and/or adapt a general purpose computer with the instructions/code stored thereon. These instructions might take the form of executable code, which is executable by the computing device 1500 and/or might take the form of source and/or installable code, which, upon compilation and/or installation on the computing device 1500 (e.g., using any of a variety of generally available compilers, installation programs, compression/decompression utilities, etc.) then takes the form of executable code.

Substantial variations may be made in accordance with specific requirements. For example, customized hardware might also be used, and/or particular elements might be implemented in hardware, software (including portable software, such as applets, etc.), or both. Further, connection to other computing devices 1500 such as network input/output devices may be employed.

Some embodiments may employ a computing device (such as the computing device 1500) to perform methods in accordance with the disclosure. For example, some or all of the procedures of the described methods may be performed by the computing device 1500 in response to processor 1510 executing one or more sequences of one or more instructions (which might be incorporated into the operating system 1540 and/or other code, such as an application program 1545) contained in the working memory 1535. Such instructions may be read into the working memory 1535 from another computer-readable medium, such as one or more of the storage device(s) 1525. Merely by way of example, execution of the sequences of instructions contained in the working memory 1535 might cause the processor(s) 1510 to perform one or more procedures of the methods described herein.

The term "computer-readable medium" includes, but is not limited to, portable or non-portable storage devices, optical storage devices, and various other mediums capable of storing, containing, or carrying instruction(s) and/or data. A computer-readable medium may include a non-transitory medium in which data can be stored and that does not include carrier waves and/or transitory electronic signals propagating wirelessly or over wired connections. Examples of a non-transitory medium may include, but are not limited to, a magnetic disk or tape, optical storage media such as compact disk (CD) or digital versatile disk (DVD), flash memory, memory or memory devices. A computer-readable medium may have stored thereon code and/or machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, or the like.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Specific details are provided in the description above to provide a thorough understanding of the embodiments and examples provided herein. However, it will be understood by one of ordinary skill in the art that the embodiments may be practiced without these specific details. For clarity of explanation, in some instances the present technology may be presented as including individual functional blocks including functional blocks comprising devices, device components, steps or routines in a method embodied in software, or combinations of hardware and software. Additional components may be used other than those shown in the figures and/or described herein. For example, circuits, systems, networks, processes, and other components may be shown as components in block diagram form in order not to obscure the embodiments in unnecessary detail. In other instances, well-known circuits, processes, algorithms, structures, and techniques may be shown without unnecessary detail in order to avoid obscuring the embodiments.

Individual embodiments may be described above as a process or method which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination can correspond to a return of the function to the calling function or the main function.

Processes and methods according to the above-described examples can be implemented using computer-executable instructions that are stored or otherwise available from computer-readable media. Such instructions can include, for example, instructions and data which cause or otherwise configure a general purpose computer, special purpose computer, or a processing device to perform a certain function or group of functions. Portions of computer resources used can be accessible over a network. The computer executable instructions may be, for example, binaries, intermediate format instructions such as assembly language, firmware, source code, etc. Examples of computer-readable media that may be used to store instructions, information used, and/or information created during methods according to described examples include magnetic or optical disks, flash memory, USB devices provided with non-volatile memory, networked storage devices, and so on.

Devices implementing processes and methods according to these disclosures can include hardware, software, firmware, middleware, microcode, hardware description languages, or any combination thereof, and can take any of a variety of form factors. When implemented in software, firmware, middleware, or microcode, the program code or code segments to perform the necessary tasks (e.g., a computer-program product) may be stored in a computer-readable or machine-readable medium. A processor(s) may perform the necessary tasks. Typical examples of form factors include laptops, smartphones, mobile phones, tablet devices or other small form factor personal computers, personal digital assistants, rackmount devices, standalone devices, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are example means for providing the functions described in the disclosure.

In the foregoing description, aspects of the application are described with reference to specific embodiments thereof, but those skilled in the art will recognize that the application is not limited thereto. Thus, while illustrative embodiments of the application have been described in detail herein, it is to be understood that the inventive concepts may be otherwise variously embodied and employed, and that the appended claims are intended to be construed to include such variations, except as limited by the prior art. Various features and aspects of the above-described application may be used individually or jointly. Further, embodiments can be utilized in any number of environments and applications beyond those described herein without departing from the broader spirit and scope of the specification. The specification and drawings are, accordingly, to be regarded as illustrative rather than restrictive. For the purposes of illustration, methods were described in a particular order. It should be appreciated that in alternate embodiments, the methods may be performed in a different order than that described.

One of ordinary skill will appreciate that the less than ("<") and greater than (">") symbols or terminology used herein can be replaced with less than or equal to ("≤") and greater than or equal to ("≥") symbols, respectively, without departing from the scope of this description.

Where components are described as being "configured to" perform certain operations, such configuration can be accomplished, for example, by designing electronic circuits or other hardware to perform the operation, by programming programmable electronic circuits (e.g., microprocessors, or other suitable electronic circuits) to perform the operation, or any combination thereof.

The phrase "coupled to" refers to any component that is physically connected to another component either directly or indirectly, and/or any component that is in communication with another component (e.g., connected to the other component over a wired or wireless connection, and/or other suitable communication interface) either directly or indirectly.

Claim language or other language reciting "at least one of" a set and/or "one or more" of a set indicates that one member of the set or multiple members of the set (in any combination) satisfy the claim. For example, claim language reciting "at least one of A and B" or "at least one of A or B" means A, B, or A and B. In another example, claim language reciting "at least one of A, B, and C" or "at least one of A, B, or C" means A, B, C, or A and B, or A and C, or B and C, or A and B and C. The language "at least one of" a set and/or "one or more" of a set does not limit the set to the items listed in the set. For example, claim language reciting "at least one of A and B" or "at least one of A or B" can mean A, B, or A and B, and can additionally include items not listed in the set of A and B.

The various illustrative logical blocks, modules, circuits, and algorithm steps described in connection with the embodiments disclosed herein may be implemented as electronic hardware, computer software, firmware, or combinations thereof. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present application.

The techniques described herein may also be implemented in electronic hardware, computer software, firmware, or any combination thereof. Such techniques may be implemented in any of a variety of devices such as general purposes computers, wireless communication device handsets, or integrated circuit devices having multiple uses including application in wireless communication device handsets and other devices. Any features described as modules or components may be implemented together in an integrated logic device or separately as discrete but interoperable logic devices. If implemented in software, the techniques may be realized at least in part by a computer-readable data storage medium comprising program code including instructions that, when executed, performs one or more of the methods described above. The computer-readable data storage medium may form part of a computer program product, which may include packaging materials. The computer-readable medium may comprise memory or data storage media, such as random access memory (RAM) such as synchronous dynamic random access memory (SDRAM), read-only memory (ROM), non-volatile random access memory (NVRAM), electrically erasable programmable read-only memory (EEPROM), FLASH memory, magnetic or optical data storage media, and the like. The techniques additionally, or alternatively, may be realized at least in part by a computer-readable communication medium that carries or communicates program code in the form of instructions or data structures and that can be accessed, read, and/or executed by a computer, such as propagated signals or waves.

The program code may be executed by a processor, which may include one or more processors, such as one or more digital signal processors (DSPs), general purpose microprocessors, an application specific integrated circuits (ASICs), field programmable logic arrays (FPGAs), or other equivalent integrated or discrete logic circuitry. Such a processor may be configured to perform any of the techniques described in this disclosure. A general purpose processor may be a microprocessor; but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Accordingly, the term "processor," as used herein may refer to any of the foregoing structure, any combination of the foregoing structure, or any other structure or apparatus suitable for implementation of the techniques described herein.

What is claimed is:

1. An apparatus for determining one or more environmental layouts, comprising:
   a memory configured to store one or more images; and
   a processor implemented in circuitry and configured to:
   detect one or more planes in an input image of an environment, the one or more planes corresponding to one or more objects in the input image;
   determine one or more three-dimensional parameters of the one or more planes;
   determine one or more polygons corresponding to the one or more objects in the input image using the one or more planes corresponding to the one or more objects in the input image and the one or more three-dimensional parameters of the one or more planes; and
   determine a three-dimensional layout of the environment based on the one or more polygons corresponding to the one or more objects in the input image.

2. The apparatus of claim 1, wherein the one or more planes include one or more two-dimensional planes.

3. The apparatus of claim 1, wherein the one or more polygons include one or more three-dimensional polygons.

4. The apparatus of claim 1, wherein the processor is further configured to detect the one or more planes using a machine learning model.

5. The apparatus of claim 1, wherein the processor is further configured to detect the one or more planes using a machine learning model and semantic segmentation.

6. The apparatus of claim 1, wherein the processor is further configured to:
   determine one or more classes of the one or more planes; and
   select the one or more planes for use in generating the one or more polygons based on the one or more classes determined for one or more planes.

7. The apparatus of claim 6, wherein the one or more classes for the one or more planes are detected using a machine learning model.

8. The apparatus of claim 1, wherein the processor is further configured to:
  detect a plurality of planes in the input image, the plurality of planes belonging to a plurality of classes;
  determine, from the plurality of planes, the one or more planes belong to a subset of one or more classes from the plurality of classes;
  select the one or more planes for use in generating the one or more polygons based on the one or more planes belonging to the subset of one or more classes; and
  discard at least plane of the plurality of planes that belongs to at least one class other than the subset of one or more classes.

9. The apparatus of claim 8, wherein the plurality of classes are detected using a machine learning model.

10. The apparatus of claim 1, wherein the one or more three-dimensional parameters include a normal vector and a plane offset for each plane of the one or more planes.

11. The apparatus of claim 10, wherein a normal vector for a plane is represented by a vector that is orthogonal to the plane.

12. The apparatus of claim 10, wherein a plane offset for a plane indicates a distance of the plane from a camera.

13. The apparatus of claim 1, wherein the processor is further configured to:
  obtain depth information associated with the one or more planes; and
  determine the one or more three-dimensional parameters of the one or more planes using the depth information.

14. The apparatus of claim 13, wherein the depth information is obtained from one or more depth sensors.

15. The apparatus of claim 13, wherein the depth information is determined using a machine learning model.

16. The apparatus of claim 1, wherein the processor is further configured to:
  determine, using the three-dimensional parameters of the one or more planes, intersections between planes of the one or more planes;
  determine a candidate set of one or more polygons based on the intersections between the planes;
  determine a final set of one or more polygons from the candidate set of one or more polygons; and
  determine the three-dimensional layout of the environment using the final set of one or more polygons.

17. The apparatus of claim 16, wherein determining the final set of one or more polygons from the candidate set of one or more polygons is based on a comparison of each polygon from the candidate set of one or more polygons to at least one of depth information, the detected one or more planes, and at least one other polygon from the candidate set of one or more polygons.

18. The apparatus of claim 16, wherein the processor is further configured to:
  determine, based on the one or more three-dimensional parameters, a polygon from the candidate set of one or more polygons is a greater distance from a camera than at least one object in the environment; and
  discard the polygon from the candidate set of one or more polygons based on the determination that the polygon is further from the camera than the at least one object in the environment.

19. The apparatus of claim 16, wherein the processor is further configured to:
  compare a polygon from the candidate set of one or more polygons to at least one plane from the detected one or more planes; and
  discard the polygon from the candidate set of one or more polygons when the polygon differs from the at least one plane by a threshold amount.

20. The apparatus of claim 16, wherein the processor is further configured to discard a polygon from the candidate set of one or more polygons when the polygon intersects with at least one other polygon from the candidate set of one or more polygons.

21. The apparatus of claim 1, wherein the processor is further configured to generate an output image based on the three-dimensional layout of the environment.

22. The apparatus of claim 1, wherein the processor is further configured to generate a three-dimensional model representing the three-dimensional layout of the environment.

23. The apparatus of claim 22, wherein the processor is further configured to:
  receive a user input to manipulate the three-dimensional model; and
  adjust at least one of a pose, a location, and a property of the three-dimensional model in an output image based on the user input.

24. The apparatus of claim 23, wherein at least one of the pose, the location, and the property of the three-dimensional model is adjusted based on semantic information defined for the three-dimensional model.

25. The apparatus of claim 1, wherein the apparatus is a mobile device including a camera for capturing the one or more images and a display for displaying the one or more images.

26. A method of determining one or more environmental layouts, the method comprising:
  detecting one or more planes in an input image of an environment, the one or more planes corresponding to one or more objects in the input image;
  determining one or more three-dimensional parameters of the one or more planes;
  determining one or more polygons corresponding to the one or more objects in the input image using the one or more planes corresponding to the one or more objects in the input image and the one or more three-dimensional parameters of the one or more planes; and
  determining a three-dimensional layout of the environment based on the one or more polygons corresponding to the one or more objects in the input image.

27. The method of claim 26, wherein the one or more planes include one or more two-dimensional planes, and wherein the one or more polygons include one or more three-dimensional polygons.

28. The method of claim 26, further comprising detecting the one or more planes using at least one of a machine learning model and semantic segmentation.

29. The method of claim 26, further comprising:
  determining one or more classes of the one or more planes; and
  selecting the one or more planes for use in generating the one or more polygons based on the one or more classes determined for one or more planes.

30. The method of claim 26, wherein the one or more three-dimensional parameters include a normal vector and a plane offset for each plane of the one or more planes, wherein a normal vector for a plane is represented by a vector that is orthogonal to the plane, and wherein a plane offset for a plane indicates a distance of the plane from a camera.

* * * * *